(12) United States Patent
Olaison et al.

(10) Patent No.: US 12,054,124 B2
(45) Date of Patent: Aug. 6, 2024

(54) LOAD CARRIER

(71) Applicant: Thule Sweden AB, Hillerstorp (SE)

(72) Inventors: Hannes Olaison, Falun (SE); Markus Nordangård, Värnamo (SE); Joakim Andersson, Anderstorp (SE); Joakim Persson, Skillingaryd (SE); Peter Wikström, Skillingaryd (SE); Johan Bolmstam, Värnamo (SE); Victor Millberg, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 156 days.

(21) Appl. No.: 17/748,671

(22) Filed: May 19, 2022

(65) Prior Publication Data
US 2022/0274532 A1  Sep. 1, 2022

Related U.S. Application Data

(63) Continuation of application No. 17/257,164, filed as application No. PCT/EP2019/067459 on Jun. 28, 2019, now Pat. No. 11,345,284.

(30) Foreign Application Priority Data

Jul. 13, 2018 (EP) .................................... 18183314

(51) Int. Cl.
B60R 9/058 (2006.01)
(52) U.S. Cl.
CPC ................... B60R 9/058 (2013.01)

(58) Field of Classification Search
CPC ......... B60R 9/058; B60R 9/052; B60R 9/048; B60R 9/08; B60R 9/04; B60R 2011/008
See application file for complete search history.

(56) References Cited

U.S. PATENT DOCUMENTS

| | | | |
|---|---|---|---|
| 5,641,107 A * | 6/1997 | Mann | B60R 9/058 224/331 |
| 8,393,508 B2 * | 3/2013 | Sautter | B60R 9/055 224/570 |
| 8,998,046 B2 * | 4/2015 | Moeller | B60R 9/058 224/309 |
| 9,038,874 B2 * | 5/2015 | Poulsen | B60R 9/058 224/329 |
| 2015/0191127 A1 * | 7/2015 | Sautter | B60R 9/052 224/331 |
| 2015/0232038 A1 * | 8/2015 | Robertson | B60R 9/052 224/325 |

(Continued)

*Primary Examiner* — Brian D Nash
(74) *Attorney, Agent, or Firm* — Sterne, Kessler, Goldstein & Fox P.L.L.C.

(57) ABSTRACT

A roof rack foot for securing a cross bar to a roof of a vehicle. The roof rack foot includes a clamping portion and an adjustment mechanism. The adjustment mechanism includes an actuation element with an actuation device, and an engagement element. The actuation element is movably engaged with the engagement element in an engagement zone. The roof rack foot is configured to be secured to the roof or the cross bar by the clamping portion by operating the adjustment mechanism with the actuation device. The actuation device and the engagement zone are at least partially provided on opposite sides of the clamping portion in at least one operating condition of the roof rack foot.

20 Claims, 13 Drawing Sheets

(56) References Cited

U.S. PATENT DOCUMENTS

| | | | | |
|---|---|---|---|---|
| 2015/0274084 A1* | 10/2015 | Sargès | .................... | B60R 9/045 |
| | | | | 224/315 |
| 2015/0321618 A1* | 11/2015 | Almhill | .................. | B60R 9/058 |
| | | | | 224/331 |
| 2016/0144795 A1* | 5/2016 | Westberg | ................ | B60R 9/045 |
| | | | | 224/322 |
| 2016/0193969 A1* | 7/2016 | Johansson | ............. | B25B 13/481 |
| | | | | 81/477 |
| 2016/0332581 A1* | 11/2016 | Almhill | .................. | B60R 9/058 |
| 2016/0339849 A1* | 11/2016 | Almhill | .................. | B60R 9/058 |
| 2020/0377034 A1* | 12/2020 | Andersson | ............. | B60R 9/058 |

* cited by examiner

A - A

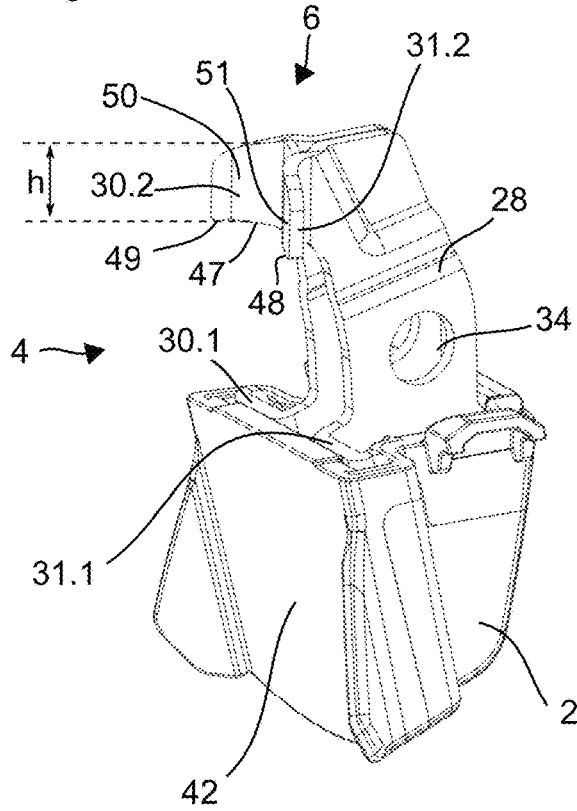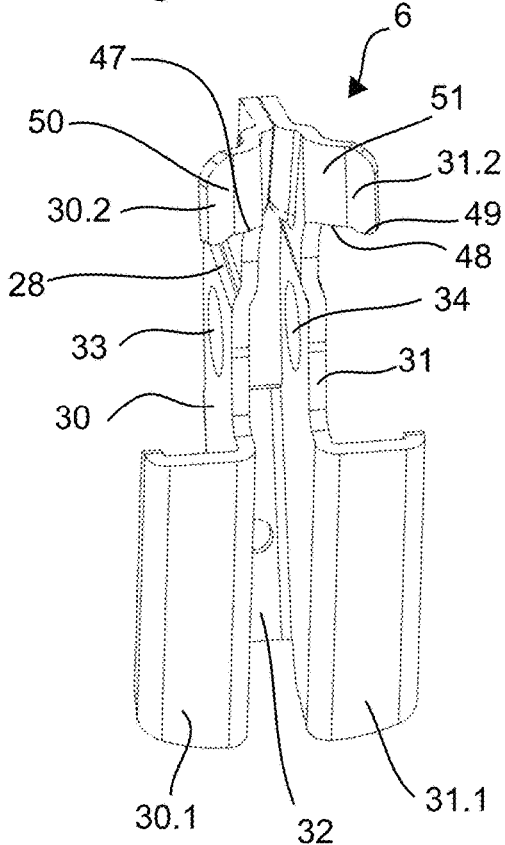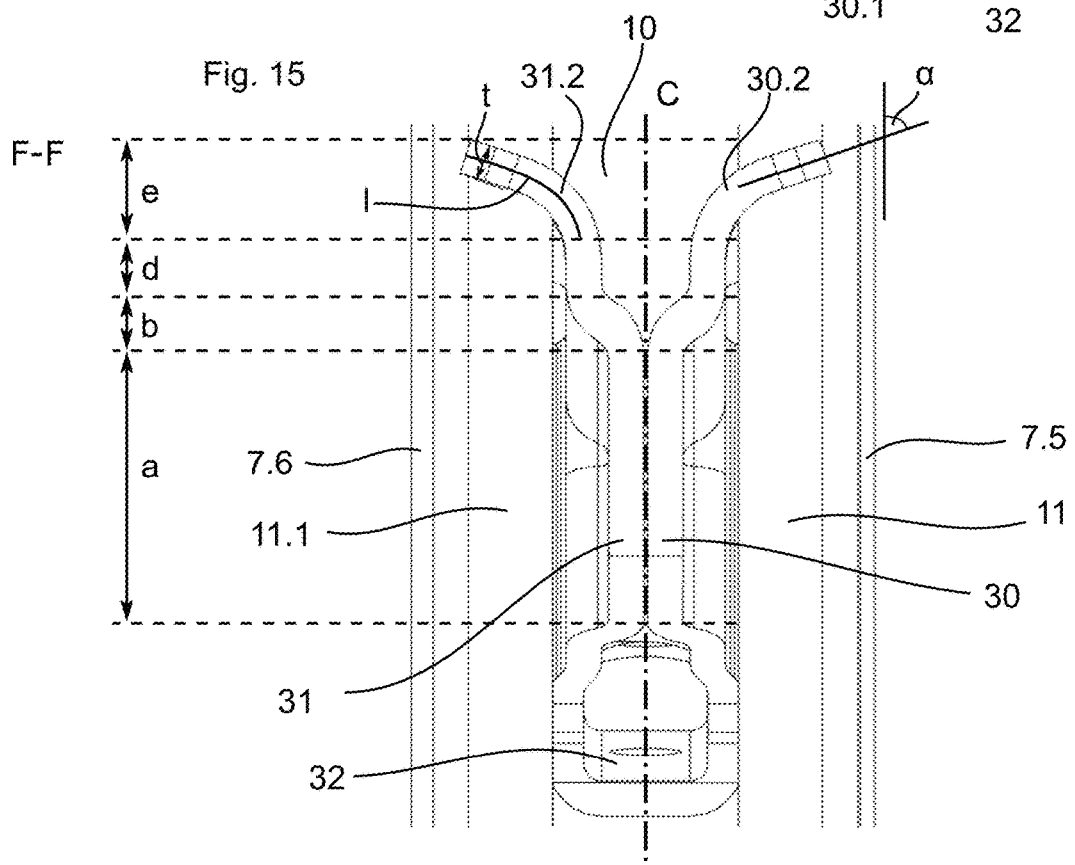

G - G

LOAD CARRIER

CROSS REFERENCE TO RELATED APPLICATIONS

This application is a continuation of U.S. application Ser. No. 17/257,164, having a 371(c) date of Dec. 30, 2020, which is a National Stage application of PCT/EP2019/067459, filed Jun. 28, 2019, which claims priority to EP Application No. 18183314.6, filed Jul. 13, 2018. The disclosures of these applications are hereby incorporated by reference in their entireties.

TECHNICAL FIELD

The present invention relates to a roof rack foot for securing a crossbar to a roof of a vehicle. Furthermore, the invention relates to an arrangement comprising such a roof rack foot and a cross bar, and to a roof rack comprising such an arrangement.

BACKGROUND

A roof rack comprises a set of bars securable to the roof of a vehicle. It may be used to carry bulky items, such as luggage, bicycles, canoes, kayaks, skies, or various carriers and containers. The roof rack usually comprises a cross bar, which extends across the roof in widthwise direction of the vehicle. The cross bar may be mounted to the vehicle roof via a roof rack foot. There are different types of roof rack foots. If the vehicle roof does not provide any kind of fixation means, e.g. a roof rail, the roof rack foot may be of a clamp-rack type, which can be clamped between the roof and an opening of a door. Alternatively, the roof rack foot may be of a raised-rail or of a flush-rail type, which may be clamped onto a rail extending in the longitudinal direction of the vehicle. The raised rail is provided spaced apart from the vehicle roof, whereas the flush rail extends in close proximity to the roof and/or is even integrated therein. For fixing the cross bar to the roof rack foot, the roof rack foot may comprise an anchoring portion for insertion into a cavity of the cross bar. Such roof rack foots are known from EP 2 995 502 A1, EP 2 586 661 A1, and DE 10 2014 207 832 A1, for example.

SUMMARY

In a first aspect, the present invention relates to a roof rack foot for securing a cross bar to a roof of a vehicle. The vehicle may be a passenger vehicle or a commercial vehicle. The roof rack foot of the present invention may also be suitable for securing a cross bar to a loading platform of a vehicle, e.g. to a loading platform of a pickup truck. The cross bar is a profile element which, in mounted state, extends across the vehicle in widthwise direction. The cross bar comprises a bottom wall with a slot extending in the longitudinal direction thereof. The longitudinal direction of the cross bar is the main extension direction thereof. The bottom wall of the cross bar is the surface, which is located on the underside of the cross bar when the same is mounted to the vehicle roof in an intended fashion. The slot may extend along the entire length of the cross bar or may be provided along a section of the cross bar only. The cross bar comprises a cavity for forming an abutment surface on the inner side of the bottom wall adjacent the slot in widthwise direction of the cross bar. The inner side of the bottom wall is oriented towards the center of the cross bar and adjoins the cavity. Accordingly, the abutment surface of the cross bar is provided inside the cross bar and may be reached from the outside via the slot and the cavity. The slot comprises a centerline, which may be a symmetry line of the slot and which may extend in the longitudinal direction of the cross bar.

The roof rack foot comprises a supporting surface for supporting the bottom wall of the cross bar thereupon. The supporting surface may be provided at the upper surface of the roof rack foot when mounted onto the vehicle roof in an intended fashion. Furthermore, the roof rack foot comprises a first and a second clamping portion for clamping the roof rack foot to the roof of the vehicle. Preferably, the first and second clamping portions are configured to clamp a roof rail of the vehicle roof therebetween. The roof rail may be a flush or a raised rail, as defined above. Alternatively, the first and second clamping portions may be configured to clamp the roof rack foot onto a pod-like element, which may be integrally formed with the vehicle roof or which may be provided removably on the vehicle roof.

In addition, the second clamping portion of the roof rack foot according to the present invention comprises an anchoring arm. An arm according to the present invention comprises a proximal and a distal end, the proximal end being provided at an object and the distal end being provided remote from said object. Preferably, the anchoring arm is a plate-like anchoring arm. A plate-like anchoring arm comprises a length, a width and a thickness extension, wherein the length and width extensions are significantly larger than the thickness extension, implying a plate-like shape of the anchoring arm. The thickness of the plate-like anchoring arm may be constant or exhibit variations which do not affect the overall plate-like nature thereof. The second clamping portion is configured to extend through the slot into the cavity when the bottom wall of the cross bar is supported on the supporting surface. Specifically, the second clamping portion is configured to lock the cross bar to the supporting surface of the roof rack foot by an engagement of the anchoring arm with the abutment surface of the cross bar. A locking of the cross bar to the supporting surface according to the present invention implies that the cross bar is fixed to the roof rack foot in such a manner that the fixation can withstand loads applied to it during the intended usage of the roof rack foot.

The roof rack foot is configured such that the anchoring arm stands upright on the abutment surface when the cross bar is locked to the roof rack foot. Therefore, when locked to the cross bar, the anchoring arm does not lie on the abutment surface. In other words, in the locked state, one of the main extension components of the anchoring arm may at least exhibit an extension component in normal direction to the abutment surface. Furthermore, the roof rack foot according to the present invention is configured such that, in a top view on the abutment surface, the anchoring arm at least partially extends away from the centerline of the cross bar at an extension angle. A top view on the abutment surface may be a view in normal direction to the abutment surface. Furthermore, partially extending away may imply that the anchoring arm comprises at least a section, where the main extension direction of the arm in said top view comprises a component perpendicular to the centerline of the cross bar. However, the anchoring arm may additionally include one or multiple sections, where its main extension in said top is parallel to the centerline. The extension angle may describe an angle between said main extension of said anchoring arm in said top view and the centerline of the slot of the crossbar in said locked state. Said extension angle may vary along the anchoring arm.

The present invention provides a roof rack foot with high mechanical stability allowing for better results in crash tests, for example. Due to the upright orientation of the anchoring arm on the abutment surface, it is very resistant against bending induced by forces applied to the anchoring arm via the abutment surface. Furthermore, due to the extension-away of the anchoring arm form the centerline of the cross bar, the anchoring arm may be provided overall closer to its turning point, thereby increasing the anchoring forces applied onto the abutment surface of the cross bar. In addition, due to the extending-away of the anchoring arm from the centerline of the cross bar, the lever variation of the anchoring arm with regard to the point of rotation of the second clamping may be reduced, thereby decreasing the pressure gradient inside the anchoring arm. All of these effects combined result in a roof rack foot with very large stability, allowing for high anchoring forces between cross bar and roof rack foot. As a result, unmasked black wingbar profiles may be used, decreasing cost and complexity of the roof rack foot.

According to an embodiment, the anchoring arm comprises a first surface and a second surface. The first surface may be defined by the thickness and the second surface may be defined by the main extensions of the anchoring arm, i.e. the length and width/height of the anchoring arm. If the anchoring arm is a plate-like anchoring arm, the first surface may be formed by one of the front faces/front surfaces/end surfaces of the anchoring arm, whereas the second surface may be formed by a plate surface thereof. The roof rack foot may be configured such that, when the cross bar is locked to the roof rack foot, the first surface engages with the abutment surface and, in a top view on the abutment surface, the second surface at least partially extends away from the centerline of the cross bar at the extension angle. If a surface extends away from a line, said surface comprises at least a section where the normal vector of said surface section is not oriented perpendicular to said line. In other words, the normal vector of said section of said surface and said line are oriented at an angle with respect to each other that is different from 90°. The second surface may comprise at least a section which is oriented perpendicular to the abutment surface or which is inclined at a different angle thereto. Furthermore, the second surface may be a plain surface or a bent surface. Preferably, the second surface exhibits at least a plain and a bent section.

According to an embodiment, the roof rack foot is configured such that, when the cross bar is locked to the roof rack foot, in a cross-sectional view of the anchoring arm that is oriented perpendicular to the abutment surface and parallel to the centerline of the cross bar, the extension of the anchoring arm along the abutment surface is shorter than the extension of the anchoring arm perpendicular to the abutment surface. In other words, in said cross-sectional view, the anchoring arm may be higher than wide. The extension of the anchoring arm perpendicular to the abutment surface may relate to the height of said anchoring arm in said cross section, wherein said height may be defined as the extension perpendicular to the abutment surface.

According to an embodiment, the surface of the anchoring arm engaging with the abutment surface of the cross bar comprises a protrusion. The protrusion may be formed along the entire surface engaging with the abutment surface or only at a section thereof. The protrusion may be formed by material of the anchoring arm or may be a separate part attached to the anchoring arm. It is also conceivable that multiple protrusions are provided at the anchoring arm. The protrusion may extend along the entire thickness of the anchoring arm. The protrusion may be configured to provide a point- and/or line-like contact with the abutment surface. Preferably, the protrusion is provided at the distal end of the anchoring arm. With this embodiment, the anchoring force can be locally increased for allowing some kind of form-fit between anchoring arm and cross bar, for example. This may provide a stronger fixation of the cross bar to the roof rack foot.

According to an embodiment, the anchoring arm of the roof rack foot exhibits, in a top view on the abutment surface, a bent profile approaching the extension angle. This allows for a smooth transition of the anchoring arm to the extension angle, thereby increasing stability. Preferably, the bent profile is present along at least half of the extension length of the anchoring arm in said top view. The extension length may be defined as the length of the anchoring arm from the proximal to the distal end in said top view.

According to an embodiment, the extension angle is between 45° and 90°. With such rather large extension angles, the above-noted technical effects of reduced pressure gradient inside the anchoring arm and increased anchoring forces are particularly present. Preferably, the extension angle is between 60° and 75° and may be 70°. This allows for rather large anchoring forces while still providing a large enough engagement of the anchoring arm and the cross bar in longitudinal direction of the cross bar to also allow for locking of these two parts via a frictional-fit.

According to an embodiment, the anchoring arm is a plate-like anchoring arm and comprises a rectangular cross section. This allows the anchoring arm to be formed from a conventional metal plate, which is cross-efficient. The height of the anchoring arm is preferably at least 1.5 times, more preferably at least 3 times, even more preferably at least 5 times larger than thickness of the anchoring arm. With these dimensional relationships of height and thickness of the anchoring arm, the above-noted technical effects of high stability and large anchoring forces are particularly well achieved.

According to an embodiment, the second clamping portion further comprises a further anchoring arm for engaging with a further abutment surface on the opposite side of the slot in widthwise direction of the cross bar. In other words, the roof rack foot is configured to exhibit anchoring arms on both sides of the slot in widthwise direction of the cross bar. Said two anchoring arms are preferably, in a top view on the abutment surfaces, formed symmetrically with respect to the centerline of the slot when the cross bar is locked to the roof rack foot. The two anchoring arms provided on both sides of the slot allow for a stronger fixation of the cross bar on the roof rack foot. Furthermore, the stress in the second clamping portion may be reduced by forming it symmetrically or substantially symmetrically with respect to the centerline of the cross bar.

According to an embodiment, the second clamping portion may comprise two plate portions, which are oriented upright with respect to the abutment surfaces of the cross bar when the cross bar is locked to the roof rack foot. The two plate portions are preferably constructed and arranged such that they, in a top view on the abutment surfaces, extend adjacent to one another along the centerline of the slot and turn away from each other to form the upright anchoring arms. The anchoring arms may each turn away from the centerline at the extension angle. This embodiment allows for strong anchoring arms, as they are formed from the plate portions and not attached thereto via any kind of fixation means.

According to an embodiment, in the top view on the abutment surfaces, the two plate portions exhibit, in the direction of the centerline, a profile, in which they extend adjacent to one another, turn away from another, run parallel to but space apart from one another, and, for forming the anchoring arms, turn away from another again. Preferably, these different sections are provided in the listed order.

According to an embodiment, the two plate portions extend through the slot and are integrally connected to each other below the bottom wall of the cross bar. Preferably, the two plate portions are formed by a single metal plate. Alternatively, the integral connection can be provided by welding or gluing of the two plate portions to each other. This embodiment allows for a very robust but cost-efficient roof rack foot.

According to an embodiment, the roof rack foot comprises an adjustment mechanism, wherein by operating the adjustment mechanism, the roof rack foot may be clamped to the vehicle roof. Preferably, by operating the adjustment mechanism, a roof rail may be clamped between the first and second clamping portions. The adjustment mechanism may be mechanically and/or electrically and/or hydraulically actuated. The adjustment mechanism may be actuated manually by a user and/or electronically via a control system. Preferably, also the cross bar is locked to the supporting surface of the roof rack foot by operating the adjustment mechanism. For example, when the adjustment mechanism is operated, the first and second clamping portions are initially moved towards each other for clamping a roof rail therebetween. Once the roof rail has been clamped between the first and second clamping portions, by further operating the adjustment mechanism, the second clamping portion may be rotated to lock the cross bar to the roof rack foot by an engagement of the anchoring arm with the abutment surface of the cross bar. The second clamping portion is preferably rotated about a point of rotation that is located below the supporting surface. This is advantageous as it allows for a large lever, thereby increasing anchoring forces.

The first aspect of the present invention further relates to an arrangement comprising a cross bar and a roof rack foot according to one of the embodiments described above in connection with the first aspect of the present invention. The cross bar comprises a bottom wall with a slot extending in the longitudinal direction of the cross bar, and a cavity for forming an abutment surface on the inner side of the bottom wall adjacent the slot in widthwise direction of the cross bar. The slot comprises a centerline. The arrangement can be configured such that, when the cross bar is locked to the roof rack foot, the extension of the anchoring arm perpendicular to the abutment surface is shorter than the extension of the cavity perpendicular to the abutment surface. Accordingly, there is a free space between the top of the anchoring arm and the top of the cavity. In other words, the anchoring arm is not locked to the top surface of the cavity, but only to the bottom wall thereof. This provides an arrangement with low complexity. Furthermore, the first aspect of the present invention relates to a roof rack comprising an arrangement according to one of the above-described embodiments. For the understanding of the individual features and their advantages, it is referred to the above.

In a second aspect, the present invention relates to a roof rack foot for securing a cross bar to a roof of a vehicle. The vehicle may be a passenger vehicle or a commercial vehicle. The roof rack foot of the present invention may also be suitable for securing a cross bar to a loading platform of a vehicle, e.g. to a loading platform of a pickup truck. The cross bar is a profile element which, in mounted state, extends across the vehicle in widthwise direction. The cross bar comprises a bottom wall with a slot extending in the longitudinal direction thereof. The longitudinal direction of the cross bar is the main extension direction thereof. The bottom wall of the cross bar is the surface, which is located on the underside of the cross bar when the same is mounted to the vehicle roof in an intended fashion. The slot may extend along the entire length of the cross bar or may be provided along a section of the cross bar only. The cross bar comprises a cavity for forming an abutment surface inside the cross bar. The abutment surface may be located on the inner side of the bottom wall and/or the inner side of the top wall of the cross bar, for example. Preferably, the abutment surface adjoins the cavity of the cross bar.

The roof rack foot comprises a supporting surface for supporting the bottom wall of the cross bar thereupon. The supporting surface may be provided at the upper surface of the roof rack foot when mounted onto the vehicle roof in an intended fashion. Furthermore, the roof rack foot comprises a first and a second clamping portion for clamping the roof rack foot to the roof of the vehicle. Preferably, the first and second clamping portions are configured to clamp a roof rail of the vehicle roof therebetween. The roof rail may be a flush or a raised rail, as defined above. Alternatively, the first and second clamping portions may be configured to clamp the roof rack foot onto a pod-like element, which may be integrally formed with the vehicle roof or which may be provided removably on the vehicle roof. In addition, the second clamping portion of the roof rack foot according to the present invention comprises an anchoring portion. The second clamping portion is configured to extend through the slot into the cavity when the bottom wall of the cross bar is supported on the supporting surface. Specifically, the second clamping portion is configured to lock the cross bar to the supporting surface of the roof rack foot by an engagement of the anchoring portion with the abutment surface of the cross bar. A locking of the cross bar to the supporting surface according to the present invention implies that the cross bar is fixed to the roof rack foot in such a manner that the fixation can withstand loads applied to it during the intended usage of the roof rack foot.

Furthermore, the second clamping portion comprises an orientation face. The orientation face is a surface provided by the second clamping portion, which may be flat/plain and/or exhibit one or multiple sections with curvature. The roof rack foot is configured such that, in an operational state of the roof rack foot allowing for an insertion of the anchoring portion into the cavity of the cross bar, the orientation face abuts against a locating surface of the roof rack foot and/or the cross bar for fixing the angular orientation of the anchoring portion with respect to the supporting surface to simplify insertion of the anchoring portion into the cavity. Fixing the angular orientation may be understood as providing a limitation for the relative pivotability of these two parts with respect to each other. The rotatability may be completely suppressed or just limited.

Accordingly, if the roof rack foot is in an operational state, in which the cross bar can be slid onto the supporting surface, the orientation face engages with the locating surface, wherein said engagement blocks or at least minimizes an angular play/tolerance of the anchoring portion with respect to the supporting surface. As a result, the movement of the roof rack foot and the cross bar relatively to each other is simplified, as the anchoring portion is prohibited from bouncing onto the abutment surface and blocking a relative displacement of said two parts with respect to each other.

According to an embodiment, the roof rack foot exhibits a first operational state, in which the anchoring portion of the second clamping portion is rotatable with respect to the supporting surface. Preferably, in this first operational state, a point of rotation of the anchoring portion is provided below the supporting surface when the roof rack foot is mounted to a roof rail in an intended fashion. The roof rack foot may further comprise a second operational state, in which the orientation face abuts against the locating surface, as described above. In the second operational state, the rotatability of the anchoring portion may be suppressed or at least limited by the engagement of the orientation face with the locating surface. Accordingly, in this second operational state, the anchoring portion may not be rotatable with respect to the supporting surface. Both operational states may be operational states of the roof rack foot during normal operation.

According to an embodiment, the roof rack foot further comprises an adjustment mechanism. By operating the adjustment mechanism, the roof rack foot can be transferred from the first to the second operational state and/or vice versa. The adjustment mechanism may be mechanically and/or electrically and/or hydraulically actuated. The adjustment mechanism may be actuated manually by a user and/or electronically via a control system. Preferably, by operating the adjustment mechanism, the first and second clamping portions are movable relatively to each other. In this regard, it is conceivable that the first and second clamping portions are maximally spaced apart from one another in the second operational state. In other words, by operating the adjustment mechanism, the first and second clamping portions can be moved apart from one another, whereas, by this movement, the orientation face of the second clamping portion may be moved towards the locating surface provided by the roof rack foot and/or the cross bar to fix the angular orientation of the anchoring portion and the supporting surface with respect to each other.

According to an embodiment, the roof rack foot comprises a supporting section with a top surface and a bottom surface. The top surface may form the supporting surface and/or the bottom surface may form the locating surface. In other words, the locating surface, against which the orientation face abuts, may be located at the underside of the supporting section, whereas the cross bar can be mounted to the supporting section at the opposite side, namely the upper side. The second clamping portion may be configured to extend through the supporting section from the bottom to the top surface. With this embodiment, the angular orientation of the anchoring portion with respect to the supporting surface may be fixed in a simple and low complex way.

According to an embodiment, the second clamping portion comprises an anchor extending through the supporting section and a sleeve, which is attached to the anchor and provided below the bottom surface of the supporting section. The sleeve may form the orientation face. The sleeve may be removably attached to the anchor to allow for an exchange thereof. This allows for a simple adaptivity of the roof rack foot to different cross bar configurations, as by exchanging the sleeve, different orientation faces may be provided.

According to an embodiment, the supporting section comprises a slot extending in the longitudinal direction of the supporting section and two locating surfaces formed by the bottom surface on both sides of the slot in widthwise direction of the supporting section. The sleeve may comprise two orientation faces for abutting against the two locating surfaces on both sides of the slot of the supporting section. With this embodiment, a very stable roof rack foot is provided, as the engagement of the two orientation faces with the two locating surfaces on both sides of the slot allows for an efficient compensation of loads exerted on the second clamping portion upon mounting of the cross bar onto the roof rack foot.

According to an embodiment, the sleeve comprises two tabs extending away from one another for forming the orientation faces. The tabs may be formed as wings. By providing the orientation faces via the tabs, the distance between the orientation faces may be increased, thereby increasing the ability to compensate loads exerted on the second clamping portion.

According to an embodiment, the sleeve is formed by injection molding. This allows for high stability, as the total sleeve is integrally formed. At the same time, it allows for a cost-efficient roof rack foot.

The second aspect of the present invention further relates to an arrangement comprising a cross bar and a roof rack foot according to one of the embodiments described above in connection with the second aspect of the present invention. The cross bar comprises a bottom wall with a slot extending in the longitudinal direction of the cross bar and a cavity for forming an abutment surface inside the cross bar. Furthermore, the second aspect of the present invention relates to a roof rack comprising such an arrangement. For the understanding of the individual features and their advantages, it is referred to the above.

In a third aspect, the present invention relates to a roof rack foot for securing a cross bar to a roof of a vehicle. The vehicle may be a passenger vehicle or a commercial vehicle. The roof rack foot of the present invention may also be suitable for securing a cross bar to a loading platform of a vehicle, e.g. to a loading platform of a pickup truck. The roof rack foot may be of a clamp-rack type, a raised-rail type and/or a flush-rail type, as defined above. Alternatively, the roof rack foot may be of any other type. The cross bar is a profile element which, in mounted state, extends across the vehicle in widthwise direction.

The roof rack foot comprises an adjustment mechanism with an actuation device, wherein the roof rack foot can be secured to the roof and/or the cross bar by operating the adjustment mechanism via the actuation device. The adjustment mechanism may be mechanically and/or electrically and/or hydraulically actuated. The actuation device may provide a mechanical interface for an external tool. Alternatively, the actuation device may be operated by hand. For example, the actuation device may provide a knob and/or lever.

Furthermore, the roof rack foot comprises a protective lid with a release button for covering the actuation device of the adjustment mechanism. Via the protective lid, the actuation device may be protected from external disturbances, e.g. dirt and rain. Furthermore, it is also conceivable that the protective lid prohibits unallowed actuation of the adjustment mechanism to prevent stealing of the roof rack foot, for example. The roof rack foot is configured such that the protectable lid can be moved for exposing the actuation device by pressing the release button. Preferably, the protective lid can be removed from the roof rack foot by pressing the release button. Alternatively, the protective lid can be pivoted via a hinge by pressing the release button to expose the actuation device, for example. Thus, by pressing the release button and exposing the actuation the device, the protective lid can be decoupled form the roof rack foot or stay coupled thereto. Preferably, the protectable lid can be moved by only pressing the release button.

The roof rack foot of the present invention allows for an exposure of the actuation device of the adjustment mechanism in a simple and comfortable way. Particularly, the protective lid can be moved by a user for exposing the actuation device with only one hand by pressing the release button. This allows the user to subsequently actuate the adjustment mechanism with the other hand. This is particularly advantageous if the actuation device comprises a mechanical interface. The user may expose the actuation device by pressing the release button with a first hand while holding a tool for actuating the adjustment mechanism via the mechanical interface in the other hand. Once the actuation device is exposed, the tool may be brought directly into engagement with the mechanical interface.

According to an embodiment, the release button is provided at the bottom side of the protective lid in a mounted state of the roof rack foot. This ensures easy access to the release button, even if the roof rack foot is mounted to relatively high vehicles, like SUVs or Vans. Preferably, the release button is pressed upwards for moving the protective lid.

According to an embodiment, the roof rack foot comprises a lid accommodation and a lid locking device which, when engaged, locks the lid in the lid accommodation. The lid accommodation may be an opening in the roof rack foot, in which the lid can be accommodated. By pressing the release button, the locking device may be released for moving the lid to expose the actuation device of the adjustment mechanism.

According to an embodiment, the locking device comprises a first protrusion on the lid accommodation and a second protrusion on the protective lid for engaging with the first protrusion. By pressing the release button, the second protrusion may be moved out of engagement with the first protrusion. Alternatively, the locking device may comprise a protrusion on the lid accommodation and a depression on the lid or vice versa, wherein by pressing the release button, the protrusion is moved out of engagement with the depression or vice versa.

According to an embodiment, the locking device may further comprise an undercut, which may be provided at the lid accommodation opposite to the first protrusion. The locking device may further comprise a hook for insertion into the undercut, wherein the hook may be provided at the lid opposite to the second protrusion. Accordingly, the locking device may comprise two complementary elements on opposite sides of the lid/lid accommodation, which can be brought into engagement with each other. This embodiment allows for a simple mounting of the lid in the lid accommodation. Firstly, the hook is inserted into the undercut before pushing the protrusions into engagement with each other. This embodiment also allows for a simple removal of the lid, as only the engagement of said two protrusions must be disintegrated.

According to an embodiment, the protective lid comprises a swing arm with a proximal and a distal end, the release button being formed at the distal end of the swing arm. The second protrusion may be formed on the swing arm between the proximal end and the distal end. The swing arm may be integrally mounted to the lid and/or comprise at least one section with decreased thickness for allowing elastic deformation thereof. Preferably, the swing arm is configured such that the second protrusion may be moved out of engagement with the first protrusion by forces applied to the release button by a user during normal operation of the roof rack foot. Alternatively, it is also conceivable that the swing arm is attached to the remaining lid via a hinge and/or articulation.

According to an embodiment, the roof rack foot is configured such that the protected lid can be removed from the lid accommodation by pressing the release button with a finger and subsequently moving the finger perpendicular to the pressing direction while the release button is still pressed. Such a configuration of the roof rack foot allows for a simple removal of the protective lid with only one finger of a user. The user can therefore hold objects in the other hand and/or the hand with which the release button is pressed while removing the protective lid from the roof rack foot.

According to an embodiment, the protective lid is formed by injection molding. Preferably, the protective lid is completely formed by injection molding. This allows for a cost-efficient roof rack foot with low complexity.

The third aspect of the present invention further relates to a roof rack comprising a roof rack foot according to one of the embodiments described above in connection with the third aspect of the present invention.

In a fourth aspect, the present invention relates to a roof rack foot for securing a cross bar to a roof of a vehicle. The vehicle may be a passenger vehicle or a commercial vehicle. The roof rack foot of the present invention may also be suitable for securing a cross bar to a loading platform of a vehicle, e.g. to a loading platform of a pickup truck.

The roof rack foot may be of a clamp-rack type, a raised-rail type and/or a flush-rail type, as defined above. Alternatively, the roof rack foot may be of any other type. The cross bar is a profile element which, in mounted state, extends across the vehicle in widthwise direction.

The roof rack foot comprises a clamping portion and an adjustment mechanism. The adjustment mechanism comprises an actuation element with an actuation device, and an engagement element. The actuation element is movably engaged with the engagement element in an engagement zone. The engagement zone may be a region where the actuation element and the engagement element of the adjustment mechanism are connected to each other. By operating the adjustment mechanism via the actuation device, the roof rack foot can be secured to the roof and/or the cross bar via the clamping portion. The adjustment mechanism may be mechanically and/or electrically and/or hydraulically actuated via the actuation device.

The roof rack foot is configured such that the actuation device for operating the adjustment mechanism and the engagement zone are at least partially provided on opposite sides of the clamping portion in at least one operating condition of the roof rack foot. The operating condition of the roof rack foot may be a state, which may be reached during normal operation of the roof rack foot. Thus, the engagement zone of the actuation element and the engagement element is provided away, i.e. behind the clamping portion, from the area where the actuation device for actuating the adjustment mechanism is located. This allows for a compact configuration of the adjustment mechanism with a large adjustment range, the large adjustment range allowing for mounting of the roof rack foot to roof rails with different dimensions, for example. According to an embodiment, the actuation device and the engagement zone are provided on opposite sides of the clamping portion in all operating conditions of the roof rack foot.

According to an embodiment, the actuation element is a nut and the engagement element is a threaded bolt, the nut being in screw connection with the bolt in the engagement zone. However, it is also conceivable that the actuation element exhibiting the actuation device comprises a threaded bolt and the engagement element a nut.

According to an embodiment, the actuation device exhibits a mechanical interface for a tool, preferably a hexagonal hole, and/or a grip portion for turning by hand. Providing a hexagonal hole as an interface for turning of the nut allows for a compact arrangement of the adjustment mechanism. The additional provision of a grip portion for turning by hand allows for operation of the adjustment mechanism without a tool.

According to an embodiment, the nut exhibits a clearance hole. The clearance hole may extend through the entire nut. The clearance hole may comprise the mechanical interface at an end portion and an internal thread at the other end portion, the clearance hole preferably exhibiting no mechanical interface and no internal thread between said two end portions. This provides a nut with a simple configuration.

According to an embodiment, the clamping portion exhibits an opening through which the actuation element extends, the actuation element comprising a shoulder for engaging with the clamping portion. Preferably, the shoulder engages the clamping portion on the side where the actuation device is located, i.e. the side opposite to the engagement zone. The shoulder may be provided substantially centrally in length direction of the actuation element. By screwing the actuation element and the engagement element onto another, the shoulder may be brought into engagement with the clamping portion to displace it, this displacement securing the roof rack foot to the roof and/or the cross bar via the clamping portion.

According to an embodiment, the actuation element, e.g. the nut, is integrally formed, preferably by cold forming. This allows for a strong and cost-efficient actuation element.

According to an embodiment, roof rack foot comprises a first and a second clamping portion for clamping the roof rack foot to the roof of the vehicle, preferably for clamping a roof rail therebetween. The actuation device may be provided on the side of the second clamping portion facing away from the first clamping portion and the engagement zone may be provided between the first and second clamping portions. By moving the engagement zone in the region between the two clamping portions and away from the location of the actuation device, a compact adjustment mechanism with large adjustment range is provided.

The fourth aspect of the present invention further relates to a roof rack comprising a roof rack foot according to one of the embodiments described above in connection with the fourth aspect of the present invention.

BRIEF DESCRIPTION OF DRAWINGS

FIG. 13 shows the second clamping portion of the roof rack foot of FIG. 5 in a perspective view.

FIG. 14 shows the anchor of the second clamping portion of FIG. 13 in a perspective view.

FIG. 15 is a close-up view of a schematic longitudinal sectional view along line F-F shown in FIG. 2 for showing the interaction of second clamping portion and cross bar.

DETAILED DESCRIPTION

Figure 1:
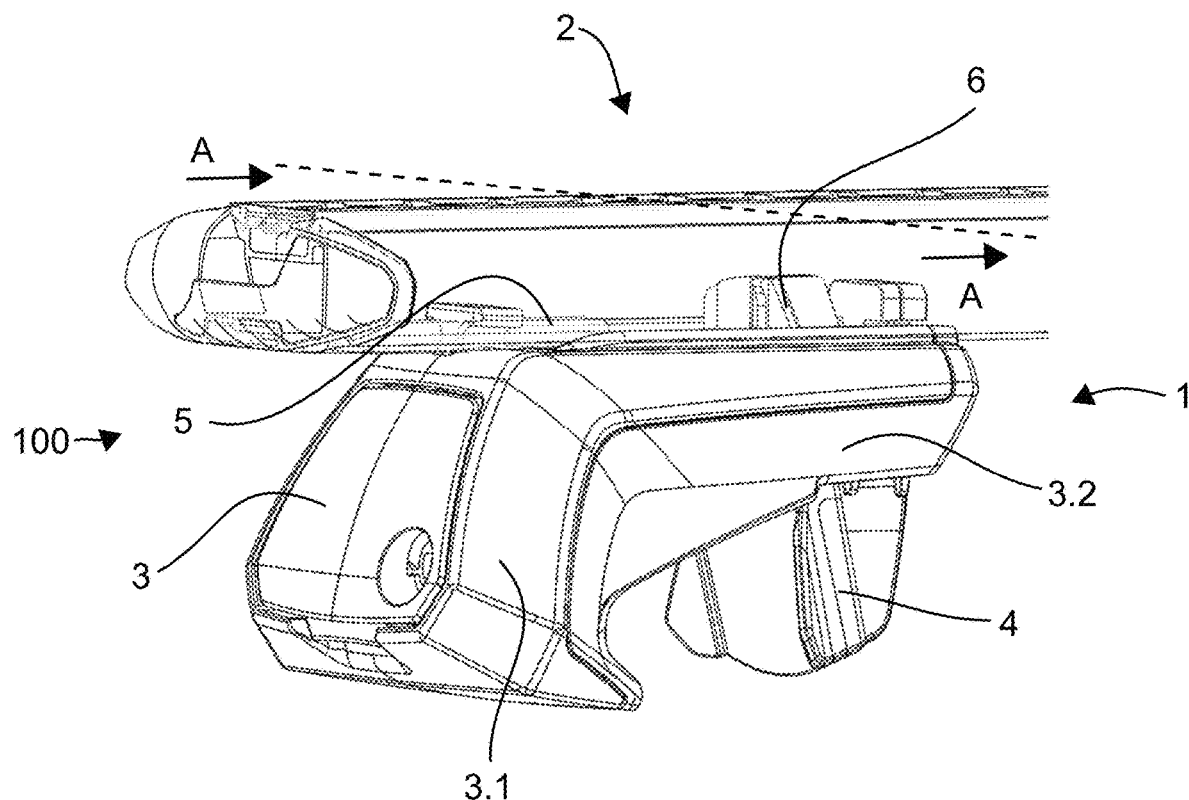
FIG. 1 shows an arrangement comprising a roof rack foot and a cross bar according to an embodiment of the present invention in a perspective view.
Figure 2:
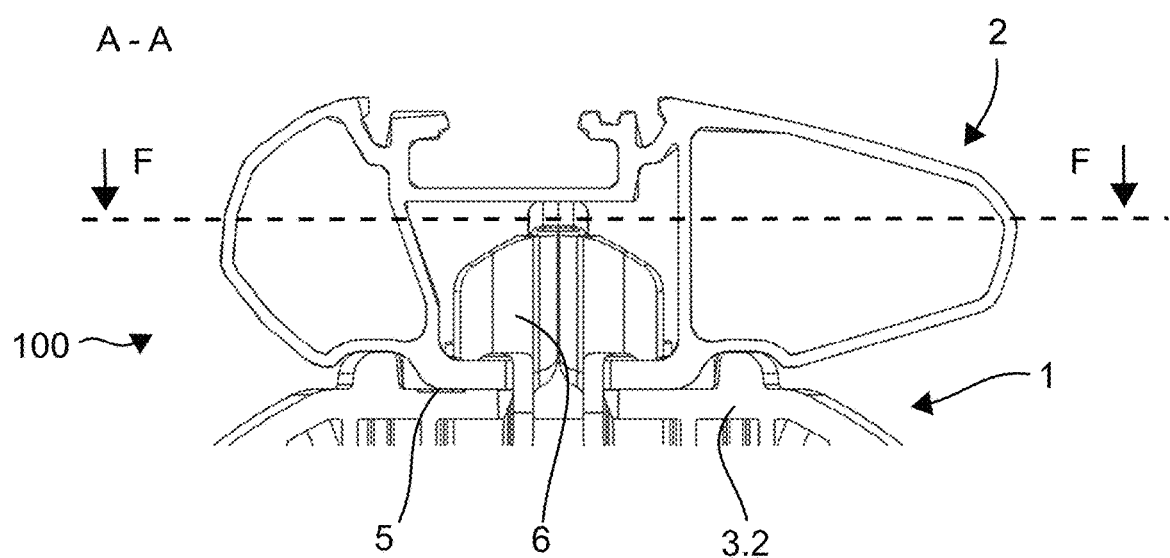
FIG. 2 is a simplified, schematic cross-sectional view of the arrangement along line A-A of FIG. 1.
Figure 8:
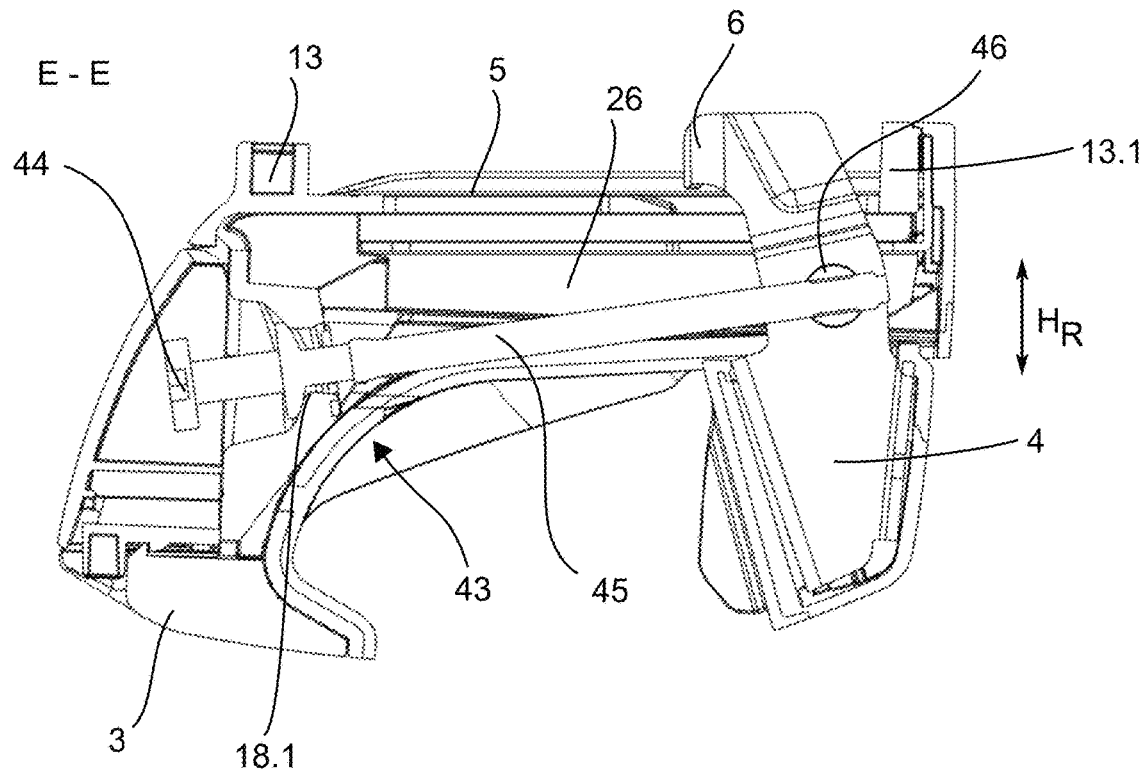
FIG. 8 is a schematic longitudinal sectional view of the roof rack foot along line E-E in FIG. 6.

FIG. 1 shows an arrangement 100 comprising a roof rack foot 1 and a cross bar 2 according to an embodiment of the present invention in a perspective view. The cross bar 2 is illustrated in FIG. 1 in transparent fashion. The roof rack foot 1 comprises a first clamping portion 3 and a second clamping portion 4. The first clamping portion 3 includes a clamping section 3.1 and a supporting section 3.2, these two sections 3.1, 3.2 being angled with respect to each other in a longitudinal section view as shown in FIG. 8. The supporting section 3.2 of the first clamping portion 3 comprises a top surface, which forms a supporting surface 5 for supporting the cross bar 2 thereupon. The second clamping portion 4 comprises an anchoring portion 6 for fixing the cross bar 2 on the roof rack foot 1. FIG. 2 shows a simplified cross-sectional view of the arrangement 100 along line A-A in FIG. 1. As illustrated in FIG. 2, in a mounted state of the arrangement 100, the cross bar 2 rests upon the supporting surface 5 of the supporting section 3.2 of the first clamping portion 3. Furthermore, the anchoring portion 6 of the second clamping portion 4 is provided inside the cross bar 2 for pressing the cross bar 2 onto the supporting surface 5 of the supporting section 3.2 of the first clamping portion 3.

The arrangement 100 shown in FIGS. 1 and 2 can be mounted to a roof rail (not shown) of a vehicle. Specifically, the arrangement 100 may be mounted to a roof rail of a raised-rail type. The vehicle may be a passenger car. The vehicle may comprise two roof rails, which extend substantially parallel to each other in longitudinal direction of the vehicle, the roof rails being provided spaced apart from each other at the left and right peripheral areas of the roof in widthwise direction of the vehicle. One of said roof rails may be clamped between the first clamping portion 3 and the second clamping portion 4 of the roof rack foot 1 for fixing the arrangement 100 to the vehicle roof. The arrangement 100 may comprise a further, preferably identical, roof rack foot (not shown) for securing the cross bar 2 of the arrangement 100 to the other opposite roof rail of the vehicle. Thus, the cross bar 2 may be mounted to the left and right roof rails of the vehicle with a roof rack foot 1 for extending in widthwise direction of the vehicle. The vehicle may comprise a second arrangement according to the present invention comprising two further roof rack foots for securing a further cross bar to the roof rails at a position, which is spaced apart from the first arrangement 100 in longitudinal direction of the vehicle. The two arrangements, which may be mounted to the roof of the vehicle spaced apart from each other, may constitute a roof rack. Further equipment, e.g. a roof basket, a bike carrier and/or a roof box, may be mounted onto the roof rack, the further equipment being fixed to both cross bar, for example.

Figure 3:
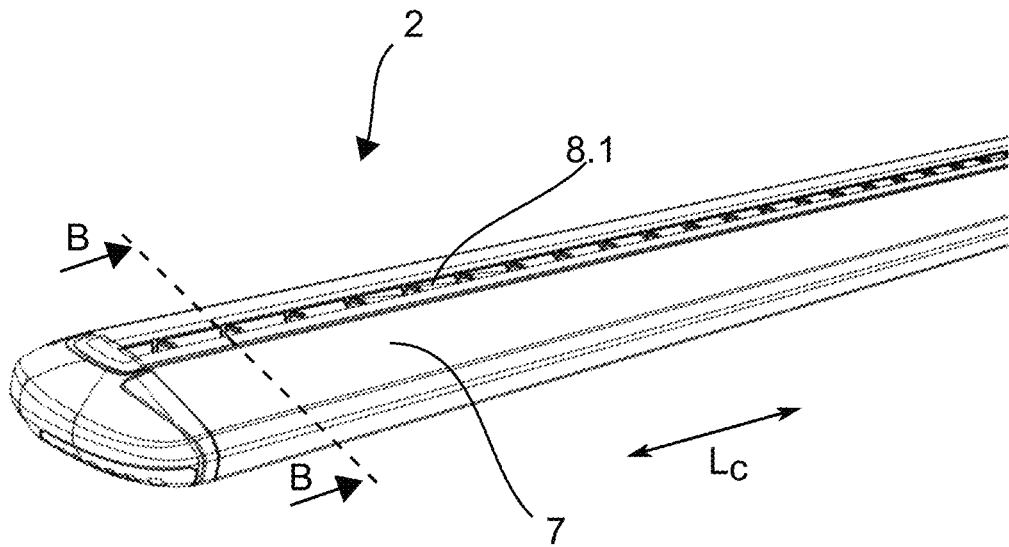
FIG. 3 shows the cross bar of FIG. 1 in a perspective view.
Figure 4:
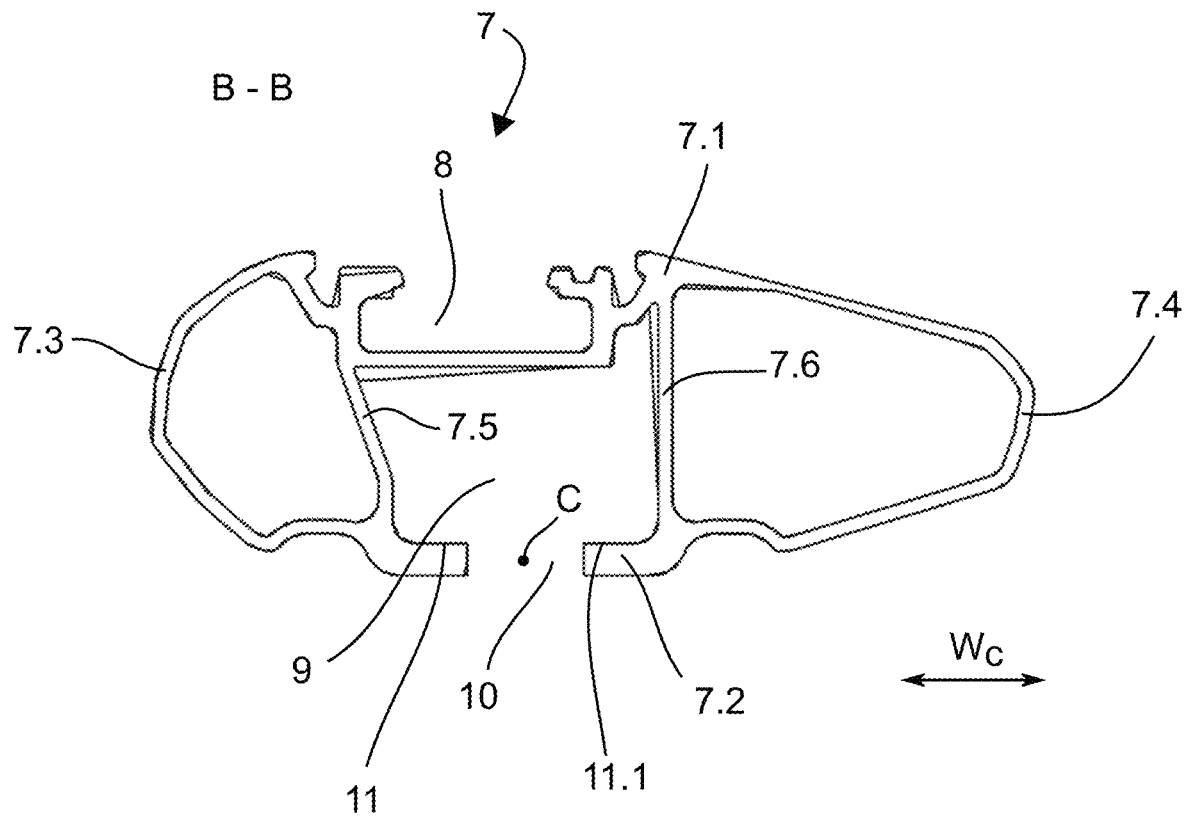
FIG. 4 is a simplified, schematic cross-sectional view of the cross bar along line B-B in FIG. 3.

FIG. 3 shows a perspective view of the cross bar 2 of the arrangement 100 shown in FIGS. 1 and 2. FIG. 4 shows a simplified cross-sectional view of the cross bar of FIG. 3 along line B-B. As illustrated in FIGS. 3 and 4, the cross bar 2 comprises a profile element 7, which is preferably made from metal, e.g. aluminum, and/or plastics. The profile element 7 may be formed by extrusion. The cross bar 2 comprises a longitudinal direction $L_c$ and a width direction $W_c$, the longitudinal direction $L_c$ constituting the main extension direction of the cross bar 2 and the width direction $W_c$ being situated perpendicular to the longitudinal direction $L_c$ and substantially running parallel to the vehicle roof when the cross bar 2 is mounted thereto in an intended fashion, for example. The profile element 7 of the cross bar 2 may be formed substantially hollow, comprising a top wall 7.1, a bottom wall 7.2 and two side walls 7.3 and 7.4. The top wall 7.1 may form a groove 8 extending in the longitudinal direction $L_c$ of the cross bar 2 for accommodating fixation means (not shown), e.g. T-pieces, with which the above-noted further equipment may be mounted onto the cross bar 2. The groove 8 may be covered by a ceiling element 8.1. The ceiling element 8.1 may comprise at least two lips, which extend towards each other in a mounted state of the ceiling element, to allow for a fixation means (not shown) to be slid along the groove 8 while the groove 8 is covered by the lips of said ceiling element 8.1.

The bottom wall 7.2 of the cross bar 2 may comprise a slot 10 extending in the longitudinal direction $L_c$ of the cross bar. The slot 10 comprises a centerline c and forms an opening to connect the outside of the cross bar 2 with the inside thereof. In addition, the cross bar 2 may comprise two inner walls 7.5 and 7.6 extending inside the cross bar 2 from the top surface 7.1 to the bottom surface 7.2. As shown in the cross-sectional view of FIG. 4, the inner walls 7.5 and 7.6 may be arranged sideways of the slot 10 in widthwise direction $W_c$ of the cross bar 2. The inner walls 7.5 and 7.6, the inside of the top wall 7.1, and the inside of the bottom wall 7.2 may form a cavity 9, which is in connection with the slot 10. Abutment surfaces 11 and 11.1 may be formed on the inside of the bottom wall 7.2 adjoining the cavity 9, said abutment surfaces 11 and 11.1 being situated adjacent the slot 10 on both sides in widthwise direction $W_c$ of the cross bar 2.

Figure 5:
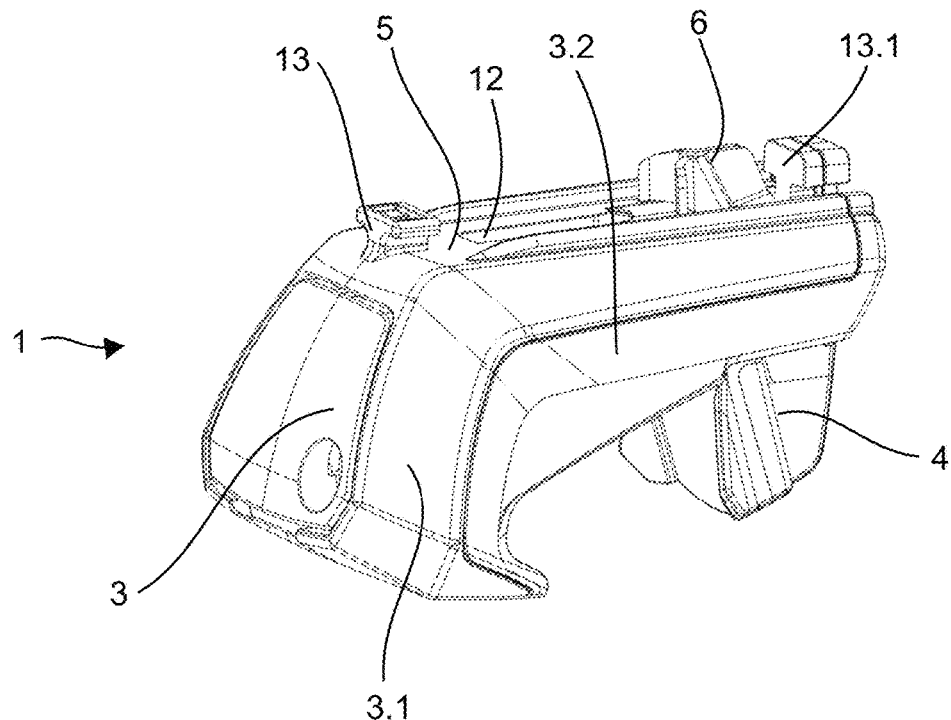
FIG. 5 shows the roof rack foot of FIG. 1 in a perspective view.

FIG. 5 shows the roof rack foot 1 of the arrangement 100 of FIGS. 1 and 2 in a perspective view. As described above, the roof rack foot 1 comprises a first clamping portion 3 and a second clamping portion 4. The first clamping portion comprises a clamping section 3.1 and a supporting section 3.2, which may be substantially arranged to each other in an L-form. In the present embodiment, the short arm of the L is formed by the clamping section 3.1 and the long arm by the supporting section 3.2. As illustrated in the top and bottom views of the roof rack foot 1 of FIGS. 6 and 7, the supporting section 3.2 comprises a top surface 14 and a bottom surface 15. The roof rack foot 1 comprises a slot 12 extending in the height direction HR between the top surface 14 and the bottom surface 15 of the supporting section 3.2, the slot 12 furthermore extending in longitudinal direction $L_R$ of the roof rack foot 1. In the present embodiment, the slot 12 is provided symmetrically to the roof rack foot 1 in widthwise direction $W_R$ thereof. The top surface 14 forms the supporting surface 5 for supporting the bottom wall 7.2 of the cross bar 2 thereupon. Furthermore, on the top surface 14, guiding elements 13 and 13.1 are provided, which may be slid into the cavity 9 of the cross bar 2 shown in FIG. 4. The guiding elements 13 and 13.1 are provided before and behind the slot 12 in longitudinal direction $L_R$ of the roof rack foot 1. Furthermore, as illustrated in FIG. 7, the bottom surface 15 of the supporting section 3.2 forms locating surfaces 16 and 16.1, which are provided adjacent the slot 12 of the supporting section 3.2 in widthwise direction $W_R$ of the roof rack foot 1. In longitudinal direction $L_R$ of the roof rack foot 1, the locating surfaces 16 and 16.1 are situated at the end portion of the slot 12, said end portion facing away from the clamping section 3.1 of the first clamping portion 3.

Figure 9:
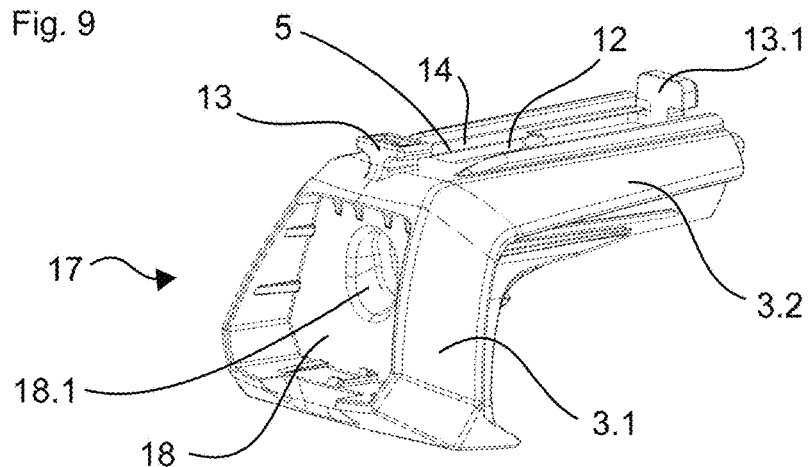
FIGS. 9 to 12 show components forming the first clamping portion of the roof rack foot of FIG. 5 in perspective views.

As illustrated in FIGS. 9 to 12, in the present embodiment, the first clamping portion 3 is substantially composed of four main components 17, 19, 22, 27. A base part 17, which is shown in FIG. 9, is L-shaped and forms the clamping section 3.1 and the supporting section 3.2 with the slot 12. The base part 17 may be integrally formed, e.g. by injection molding. The base part 17 forms the top surface 14 and therefore also the supporting surface 5 as well as the guiding elements 13 and 13.1 of the first clamping portion 3. As will be described in the following, the first clamping portion 3 furthermore comprises a lid accommodation 18, said lid accommodation 18 being formed by said base part 17. The lid accommodation 18 comprises an opening 18.1 allowing for an actuation bar 45 of an adjustment mechanism 43 to pass therethrough, the adjustment mechanism 43 being described in the following.

Figure 11:
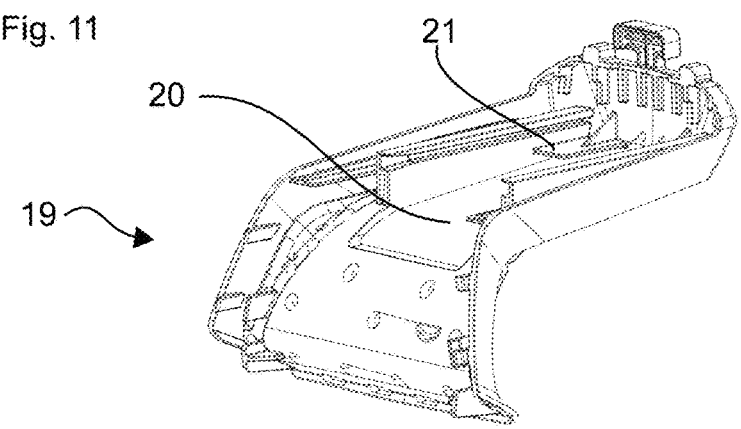

The first clamping portion 3 furthermore comprises a holding part 19, which is shown in FIG. 11. The holding part 19 is also substantially formed in an L-shape and is configured to be mounted to the underside of the base part 17. In the present embodiment, the holding part 19 comprises a central inner opening 20, which is formed in the long leg of the L-form. Planar extensions 21 (only one extension shown in FIG. 11) extend towards each other inside the opening 20 of the holding part 19. The bottom sides of said planar extensions 21 form the locating surfaces 16 and 16.1 discussed above in connection with FIG. 7.

Figure 10:
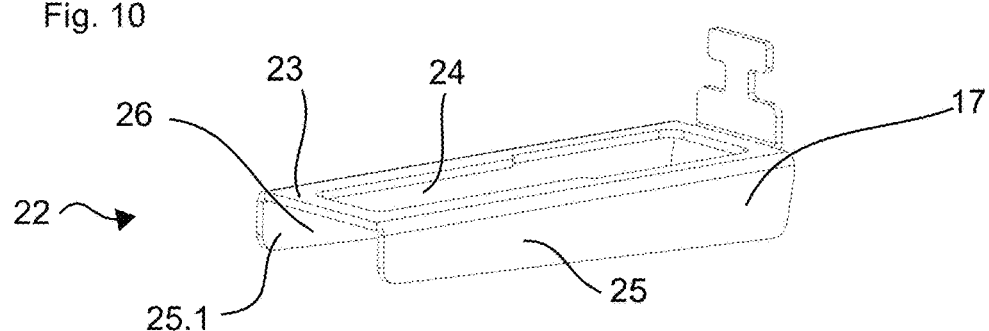

The first clamping portion 3 furthermore comprises a guiding part 22, which is shown in FIG. 10. The guiding part 22 comprises an upper frame 23 of a substantially rectangular shape, the frame encircling an opening 24. Furthermore, the guiding part 22 comprises two plate-shaped guiding members 25, 25.1, which are each arranged perpendicular to the upper frame element 23. On the inside towards the opening 24, the guiding elements 25 and 25.1 each form guiding surfaces 26 (only one of which is shown in FIG. 10). The guiding part 22 is fixated between the base part 17 shown in FIG. 9 and the holding part 19 shown in FIG. 11 when both are assembled to each other. When assembled, the slot 12 of the base part 17, the opening 24 of the guiding part 22 and the opening 20 of the holding part 19 are aligned with each other to provide an opening extending from the top surface 14 to the bottom surface 15 of the first clamping portion 3.

Figure 12:
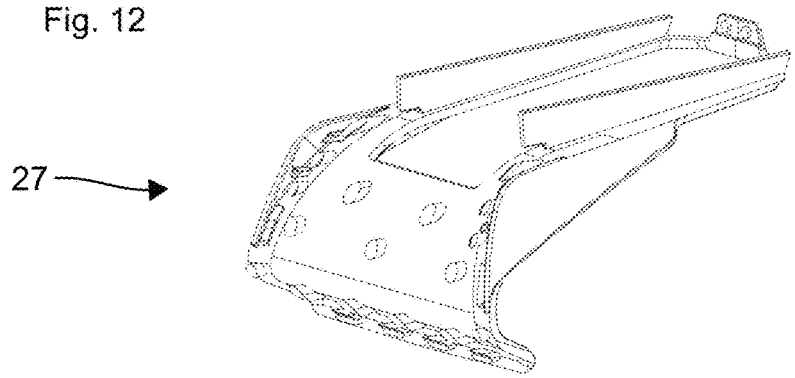

In addition, the first clamping portion 3 comprises a rail part 27, which is shown in FIG. 12. The rail part 27 is mounted to the underside of the holding part 19 to provide a surface contour and/or material property optimized for engagement with the roof rail of a vehicle. The rail part 27 may be provided in an exchangeable manner.

FIG. 13 shows the second clamping portion 4 of the roof rack foot 1 of the present embodiment in a perspective view. The second clamping portion 4 comprises an anchor 28 and a sleeve 29. In the present embodiment, the anchor 28 is made from a single metal plate, as shown in FIG. 14. The anchor 28 substantially comprises two plate portions 30 and 31, which run parallel to but spaced apart from another at the bottom and which run adjacent in close proximity to one another at the top portion of the anchor 28. The plate portions 30 and 31, which are spaced apart from another at the bottom portion, are connected to each other at said bottom portion via a connection link 32. Furthermore, the anchor 28 comprises planar protrusions 30.1 and 31.1, which extend away from each other and the connection link 32. The planar protrusions 30.1, 31.1 are provided at the bottom portion of the anchor 28. The top portion of the anchor 28, where the plate portions 30 and 31 run adjacent in close proximity to each other, constitutes an anchoring portion 6 with anchoring arms 30.2 and 31.2, which will be described in more detail in the following. In addition, the plate portions 30 and 31 of the anchor 28 each comprise bores 33 and 34 for accommodating the actuation bolt 46 of an adjustment mechanism 43, which will also be described in the following. The bores 33 and 34 are situated between the planar protrusions 30.1 and 31.1 and the anchoring portion 6 of the anchor 28.

Figure 16:
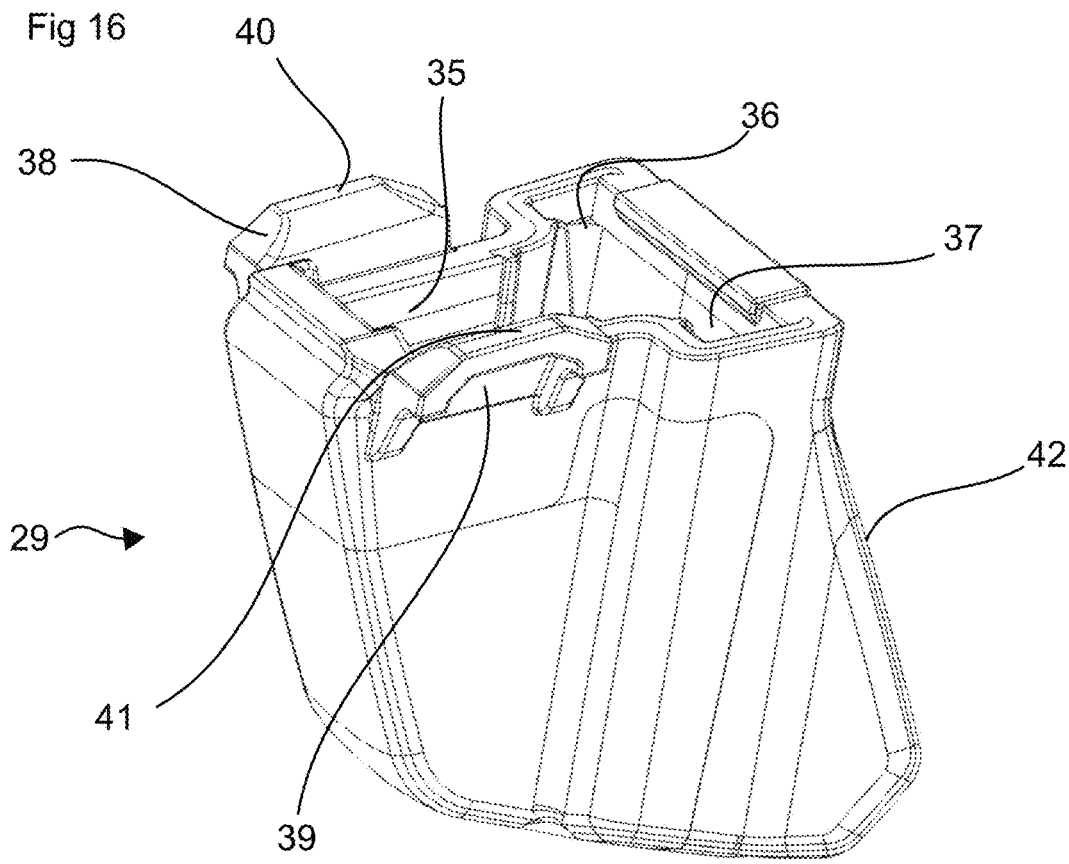
FIG. 16 shows the sleeve of the second clamping portion of FIG. 13 in a perspective view.
Figure 17:
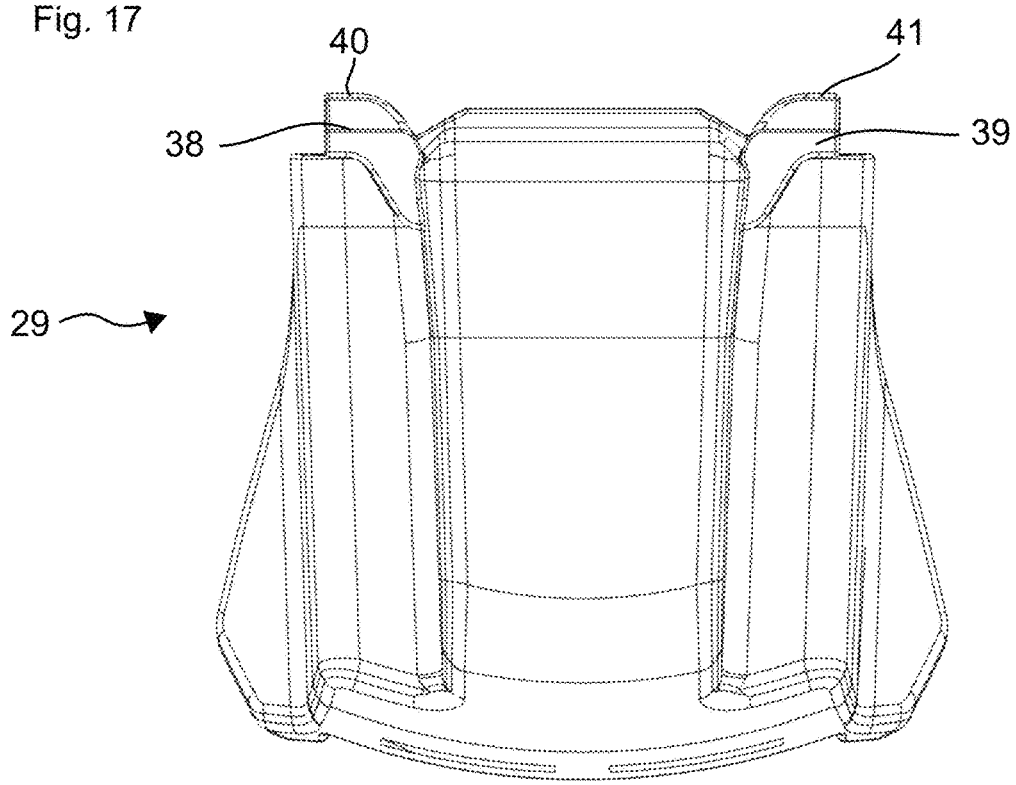
FIG. 17 shows the sleeve of the second clamping portion of FIG. 13 in a rear view.

The sleeve 29 of the second clamping portion 4 is shown in a perspective and a rear view in FIGS. 16 and 17. In the present embodiment, the entire sleeve 29 is made from a single part, preferably by injection molding. The sleeve 29 comprises a first chamber 35 for accommodating the parallel but spaced apart plate portions 30 and 31 as well as the connection link 31 of the bottom portion of the anchor 28. In addition, the sleeve 29 comprises a second and a third chamber 36 and 37 for accommodating the planar protrusions 30.1 and 31.1 of the anchor 28. The sleeve 29 is configured to be pushed onto the bottom portion of the anchor 28 such that it is fixated thereupon during normal operation of the roof rack foot 1. In addition, the sleeve 29 comprises two tabs 38 and 39, which extend away from each other and are mounted to the side surfaces of the first chamber 35 of the sleeve 29. The two tabs 38 and 39 are mounted to the top portion of the sleeve 29 and extend upwards, therefore constituting the highest reaching portions of the sleeve 29 in the height direction thereof. The top surfaces of the tabs 38 and 39 each form an orientation face 40 and 41, respectively. In the present embodiment, the orientation faces 40 and 41 are planar surfaces with a substantially rectangular shape. Furthermore, the sleeve 29 comprises a rail surface 42, which can be seen in FIG. 7, for example. The rail surface 42 is configured to engage with a rail of the roof of a vehicle. In the present embodiment, the rail surface 42 is facing away from the tabs 38, 39 and the orientation faces 40, 41.

As derivable from FIGS. 5 to 8, the anchor 28 of the second clamping portion 4 extends through the slot 12 of the first clamping portion 3 such that the anchoring portion 6 of the second clamping portion 4 is situated above the top surface 14 and therefore the supporting surface 5 of the roof rack foot 1. The sleeve 29 of the second clamping portion 4, on the other hand, is located below the bottom surface 15 of the first clamping portion 3, as illustrated in FIG. 7. Furthermore, the roof rack foot 1 is configured such that the second clamping portion 4 is provided movably inside the slot 12 of the first clamping portion 3. The roof rack foot 1 further comprises an adjustment mechanism 43 for moving the second clamping portion 4 relatively to the first clamping portion 3. As illustrated in FIG. 8, the adjustment mechanism 43 comprises an actuation device 44, which is connected to an actuation bar 45, the actuation bar 45 being mechanically connected to an actuation bolt 46. As derivable from FIG. 8, the actuation device 44 is provided in the lid accommodation 18, and the actuation bar 45 extends through the opening 18.1 from the clamping section 3.1 towards the supporting section 3.2 and the second clamping portion 4. The actuation bold 46 is supported in the bores 33 and 34 and mechanically locked to the anchor 28 of the second clamping portion 4. As shown in FIG. 8, the actuation bold 46 engages with the guiding surfaces 26 of the guiding part 22 of the first clamping portion 23, which is shown in FIG. 10. By actuating the actuation device 44 of the adjustment mechanism 43, the second clamping portion 4 is moved via the actuation bolt 46 and the actuation bar 45 relatively to the clamping section 3.1 of the first clamping portion 3. This relative movement of the first clamping portion 3 and the second clamping portion 4 is guided by the contact of the actuation bolt 46 with the guiding surfaces 26 of the guiding part 22 of the first clamping portion 3.

Figure 6:
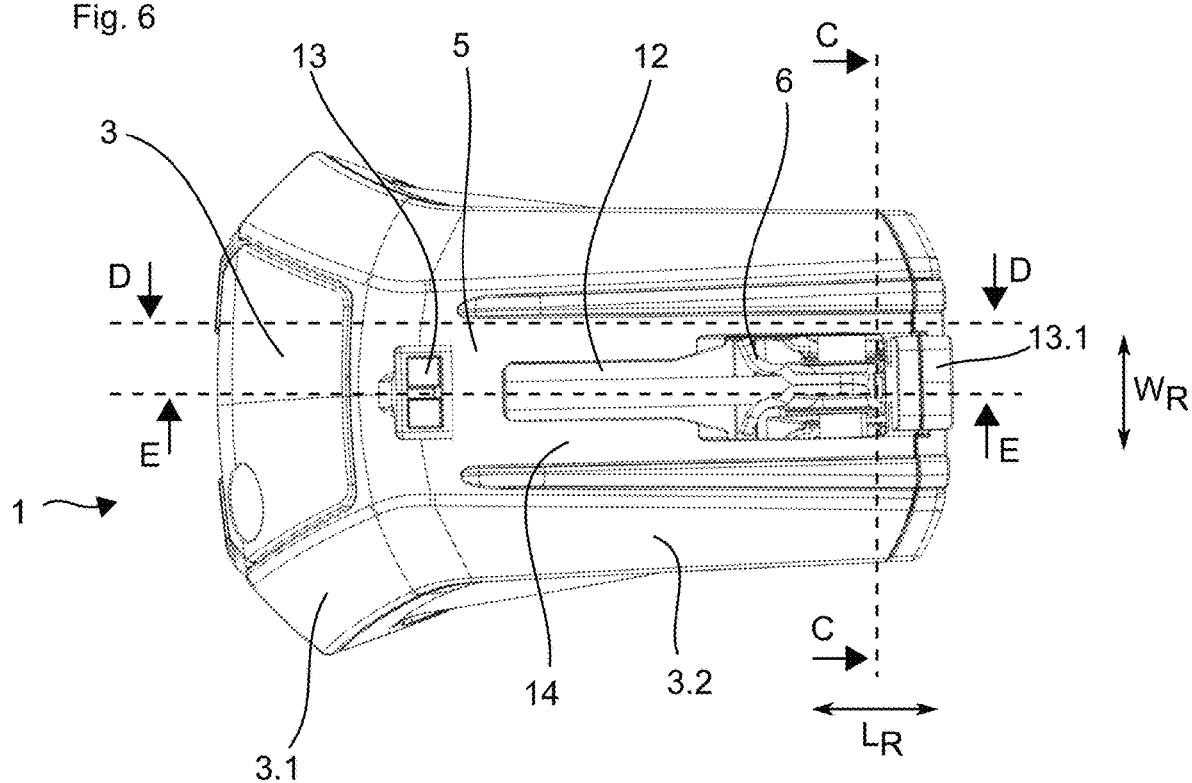
FIG. 6 shows the roof rack foot of FIG. 5 in a top view.
Figure 7:
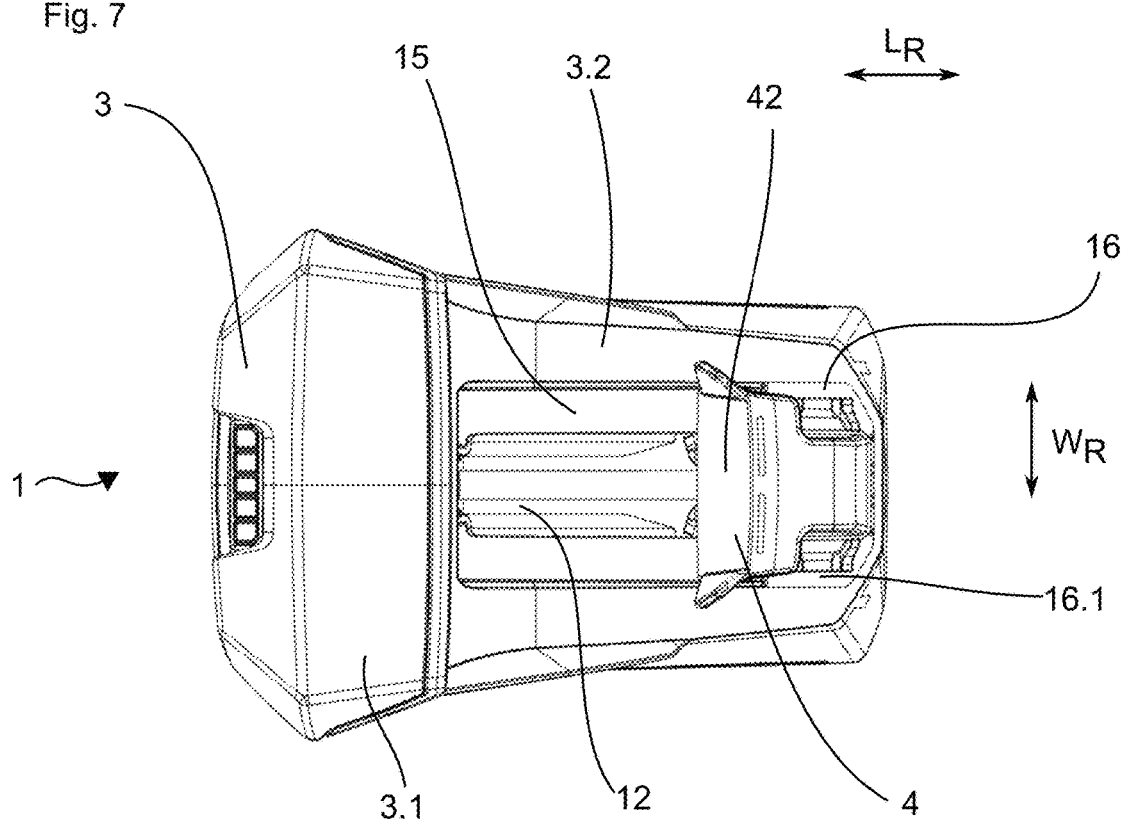
FIG. 7 shows the roof rack foot of FIG. 5 in a bottom view.
Figure 18:
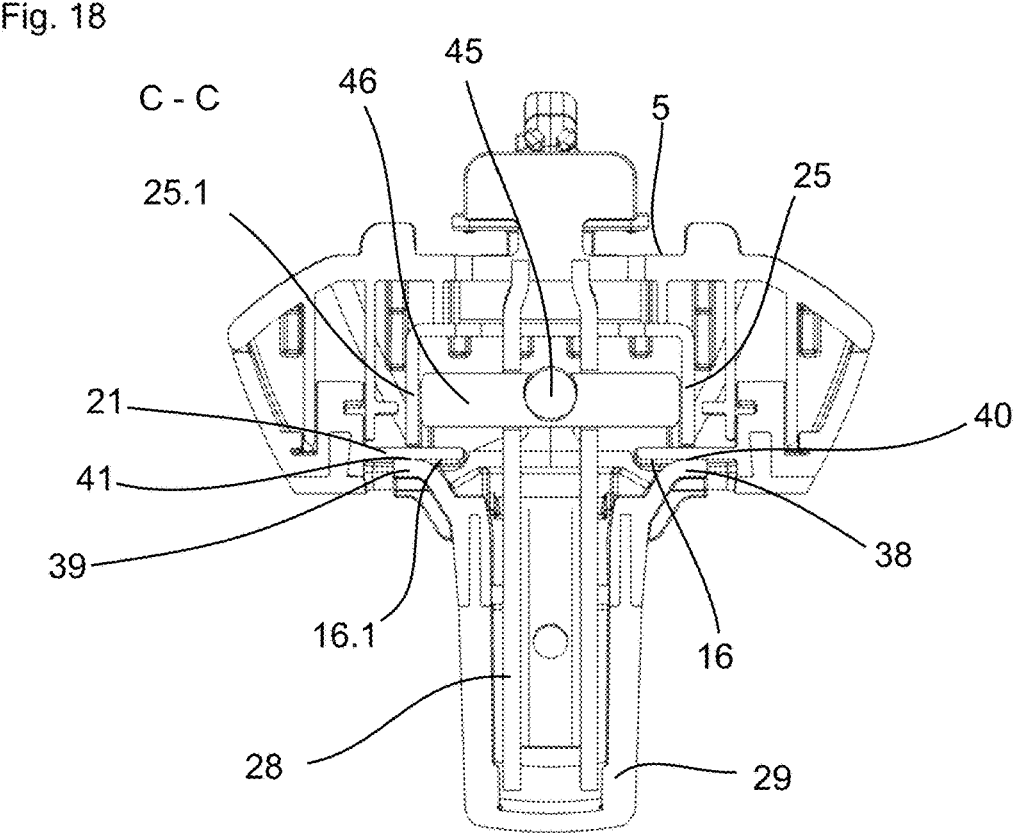
FIG. 18 is a schematic sectional view along line C-C of FIG. 6 for showing the interaction of the sleeve of the second clamping portion and the first clamping portion.
Figure 19:
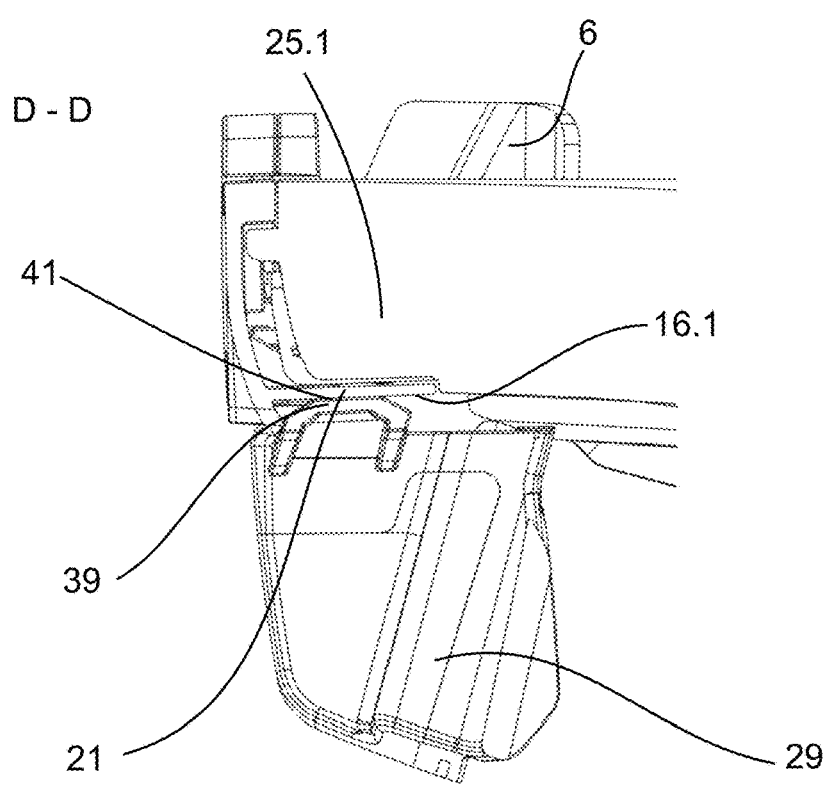
FIG. 19 is a schematic sectional view along line D-D of FIG. 6 for showing the interaction of the sleeve of the second clamping portion and the first clamping portion.

FIGS. 18 and 19 show sectional views of the roof rack foot 1 in an operational state where the first clamping portion 3 and the second clamping portion 4 are maximally spaced apart from each other along line C-C (FIG. 18) and line D-D (FIG. 19) of FIG. 6, respectively. Said operational state is reached by actuating the adjustment mechanism 43. As derivable from FIGS. 18 and 19, in such an operational state, the orientation faces 40 and 41 of the tabs 38 and 39 of the sleeve 29 of the second clamping portion 4 abut against the locating surfaces 16 and 16.1 on the bottom surface 15 of the first clamping portion 3, as also illustrated in FIG. 7. By reasons of this abutment of the orientation faces 40 and 41 with the locating surfaces 16 and 16.1, the angular orientation of the second clamping portion 4 is fixed with respect to the first clamping portion 3. Specifically, by the aforesaid abutment, the angular orientation of the anchoring portion 6 of the anchor 28 of the second clamping portion 4 is fixed in its angular orientation with respect to the supporting surface 5 formed by the supporting section 3.1 of the first clamping portion 3. Furthermore, in said operational state, the anchoring portion 6 of the anchor 28 of the second clamping portion 4 is spaced apart from the supporting surface 5 of the supporting section 3.2 of the first clamping portion 3. Accordingly, the anchoring portion 6 of the second clamping portion 4 can be easily inserted into the cavity 6 of the cross bar 2, as an engagement of said anchoring portion 6 with the abutment surface 11 of the cross bar is prohibited. By operating the adjustment mechanism 43, the roof rack foot 1 can be transferred to a different operational state, in which the orientation faces 40, 41 of the tabs 38, 39 of the sleeve 29 do not engage with the locating surfaces 16, 16.1 of the first clamping portion. In said different operational state, the anchoring portion 6 can be rotated relatively to the supporting surface 5 of the first clamping portion 3.

As described above, the anchoring portion 6 of the anchor 28 of the second clamping portion 4 comprises anchoring arms 30.2 and 31.2. In the present embodiment, the anchoring arms 30.2 and 31.2 are plate-shaped and exhibit a rectangular cross section.

As described above, the anchoring arms 30.2 and 31.2 are formed from the plate portions 30 and 31 of the anchor 28, therefore being integrally formed with the anchor 28. To lock the cross bar 2 to the supporting surface 5 of the first clamping portion 3 of the roof rack foot 1, the anchoring portion 6 of the second clamping portion 4 is inserted into the cavity 9 of the cross bar 2. During this step, the first clamping portion 3 and the second clamping portion 4 are maximally spaced apart from each other such that the orientation faces 40 and 41 engage with the locating surfaces 16 and 16.1 of the first clamping portion, as described above. Subsequently, the adjustment mechanism 43 is actuated to move the second clamping portion 4 towards the first clamping portion 3 for clamping a roof rail (not shown) therebetween. Once the first and second clamping portions 3, 4 contact the roof rail (not shown), the adjustment mechanism 43 is further actuated to effectuate a rotation of the second clamping portion 4, i.e. the anchoring portion 6, towards the abutment surfaces 11, 11.1 formed inside the cavity 9 of the cross bar 2. Through this rotation, the anchoring arms 30.2 and 31.2 of the anchoring portion 6 are brought into engagement with the abutment surfaces 11, 11.2 of the cross bar 2 to press the cross bar 2 onto the supporting surface 5 of the roof rack foot 1. This state is shown in FIG. 2 (cross sectional view along A-A) and in FIG. 15 (close-up longitudinal sectional view along F-F).

As derivable from FIG. 15, showing a top view onto the abutment surfaces 11, 11.1 of the cross bar 2, the plate portions 30, 31 of the anchor 28, in the direction of the centerline c of the slot 10, extend adjacent to another and symmetrical with respect to the centerline c of the slot 10 (section a), turn away from each other while being arranged symmetrical with respect to the centerline c (section b), extend parallel to each other and symmetrical with respect to the centerline c (section d), and turn away from each other while still be arranged symmetrical with respect to the centerline c for forming the anchoring arms 30.2 and 31.2 (section e). In the present embodiment, in the above-noted top view onto the abutment surfaces 11, 11.1 of the cross bar 2, only in section e, the plate portions 30 and 31, i.e. the anchoring arms 30.2, 31.2, are situated above the abutment surfaces 11 and 11.1 of the cross bar 2. Specifically, in the top view shown in FIG. 15, in sections a, b and d, the plate portion 30 and 31 are situated above the slot 10 and not over the abutment surfaces 11, 11.1. As indicated in FIG. 15, the anchoring arm 30.2 and 31.2 are bent to approach an extension angle α. The transition from the straight section d to the extension angle α is formed smoothly such that said bent profile is present over half of the anchoring arm extension length 1 in said top view, the extension length 1 being the length along a line running from the proximal to the distal end of the anchoring arm 30.2, 31.2 always centrally in thickness direction t thereof. In the present embodiment, the extension angle α is around 70°.

In addition, the anchoring arms 30.2 and 31.2 each comprise a first surface 47, 48 for engaging with the abutment surfaces 11, 11.1 of the cross bar 2. The first surfaces 47, 48 are defined by the thickness t of the plate-like anchoring arms 30.2 and 31.2. In the present embodiment, the first surfaces 47, 48 are the faces of the anchoring arms 30.2, 31.2 defined by the thickness t and facing the protrusions 30.1, 31.1. The first surfaces 47, 48 each comprise a protrusion 49, which is situated at the distal end of the anchoring arm. Furthermore, the anchoring arms 30.2 and 31.2 each comprise a second surface 50, 51, which is defined by the main extensions, i.e. not the thickness extension, of the anchoring arms 30.2 and 31.2.

When the first surfaces 47, 48 with their protrusions 49 of the anchoring arms 30.2, 31.2 engage with the abutment surfaces 11, 11.2 of the bottom wall 7.2 of the cross bar 2, the anchoring arms 30.2, 31.2 and their second surfaces 50, 51 stand upright on the abutment surfaces 11, 11.1 and extend away from the centerline c of the cross bar 2 at the extension angle α. In such a configuration, also the plate portions 30 and 31 of the anchor 28 of the second clamping portion 4 are oriented upright with respect to the abutment surfaces 11, 11.1 of the cross bar 2. In the present embodiment, the anchoring arms 30.2, 31.2 are configured such that their height h, namely their extension perpendicular to the abutment surfaces 11, 11.1 in the state shown in FIG. 15, is at least five times larger than the thickness t of the plate-like anchoring arms 30.2 and 31.2.

Figure 20:
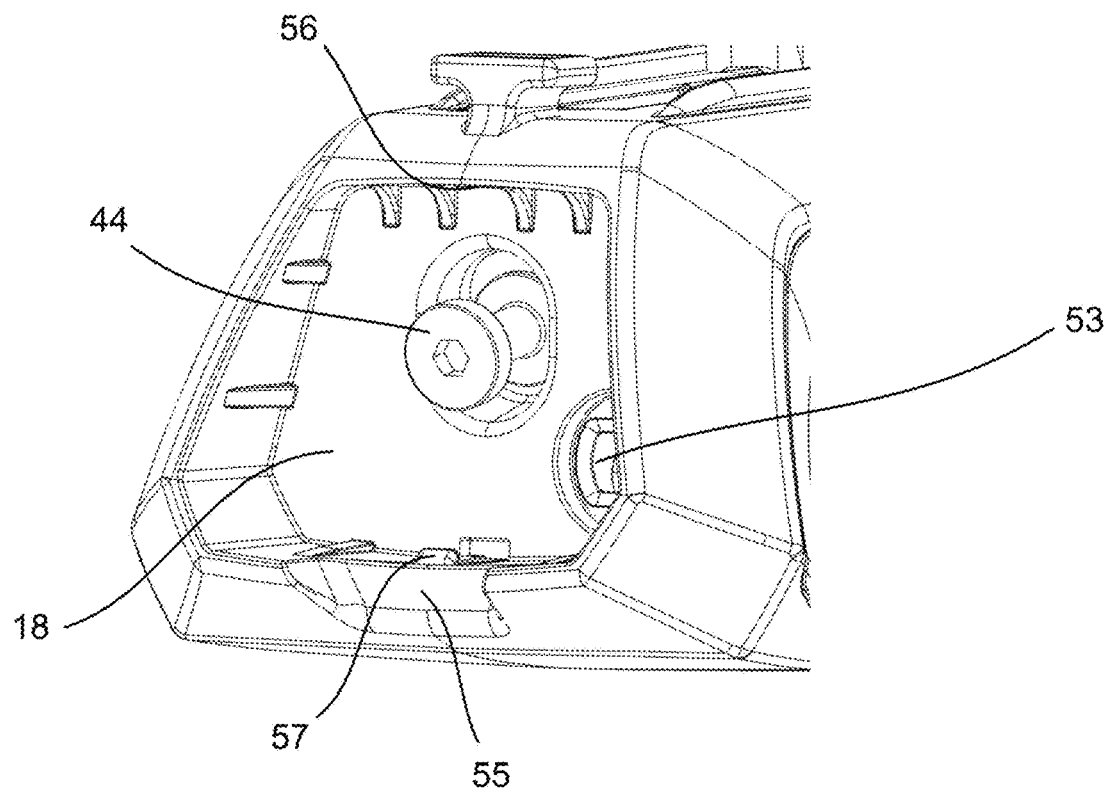
FIG. 20 shows the lid accommodation of the roof rack foot of FIG. 5 in a perspective view.

Furthermore, as described above in connection with FIG. 9, the first clamping portion 3 exhibits a lid accommodation 18, which is provided at the clamping section 3.1, namely on the side facing away from the second clamping portion 4. The lid accommodation 18 comprises a cavity, in which the actuation device 44 of the adjustment mechanism 43 is provided. As derivable from FIG. 20, the actuation device 44 in the present embodiment is configured as a mechanical interface for a tool. In other words, the adjustment mechanism 43 is actuated via a tool, which is brought into engagement with the mechanical interface 44 provided in the cavity of the lid accommodation 18. In the present embodiment, the cavity of the lid accommodation 18 has a substantially rectangular cross section. The lid accommodation 18 is configured to accommodate a lid 52 for covering the actuation device 44, e.g. the mechanical interface, of the adjustment mechanism 43.

The lid accommodation 18 may additionally comprise a locking mechanism 53, with which a locking member inserted into the lid 52 can be engaged to lock the lid 52 in the lid accommodation 18. This may prohibit unallowed actuation of the adjustment mechanism 43 for demounting and potentially steeling of the roof rack, for example.

Figure 21:
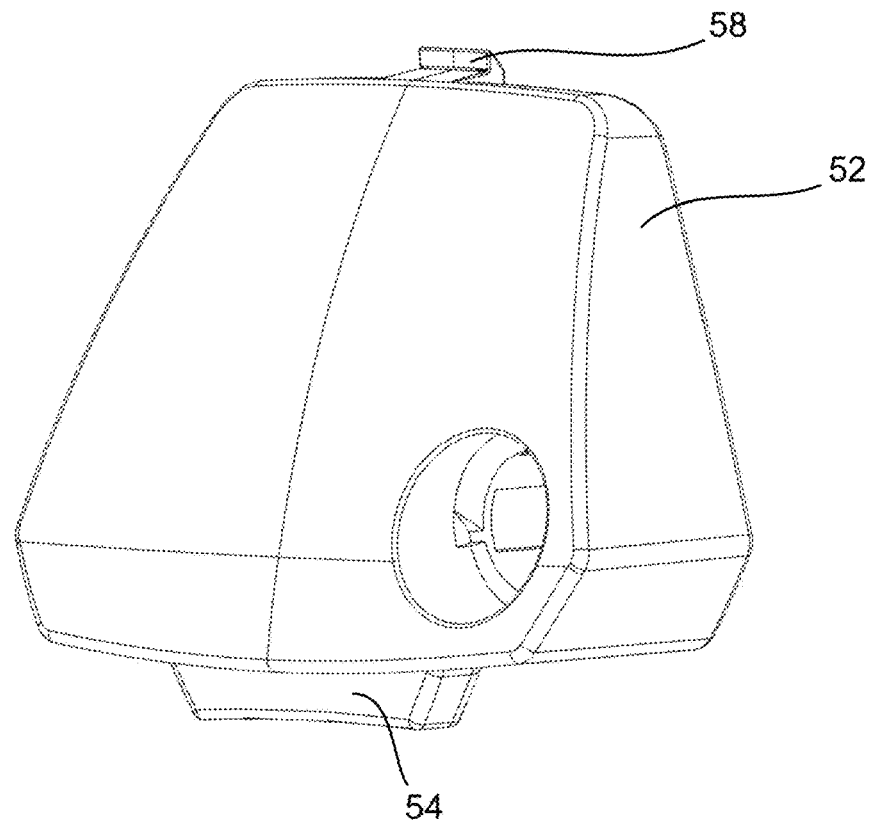
FIG. 21 shows the lid of the roof rack foot of FIG. 5 in a perspective view.
Figure 22:
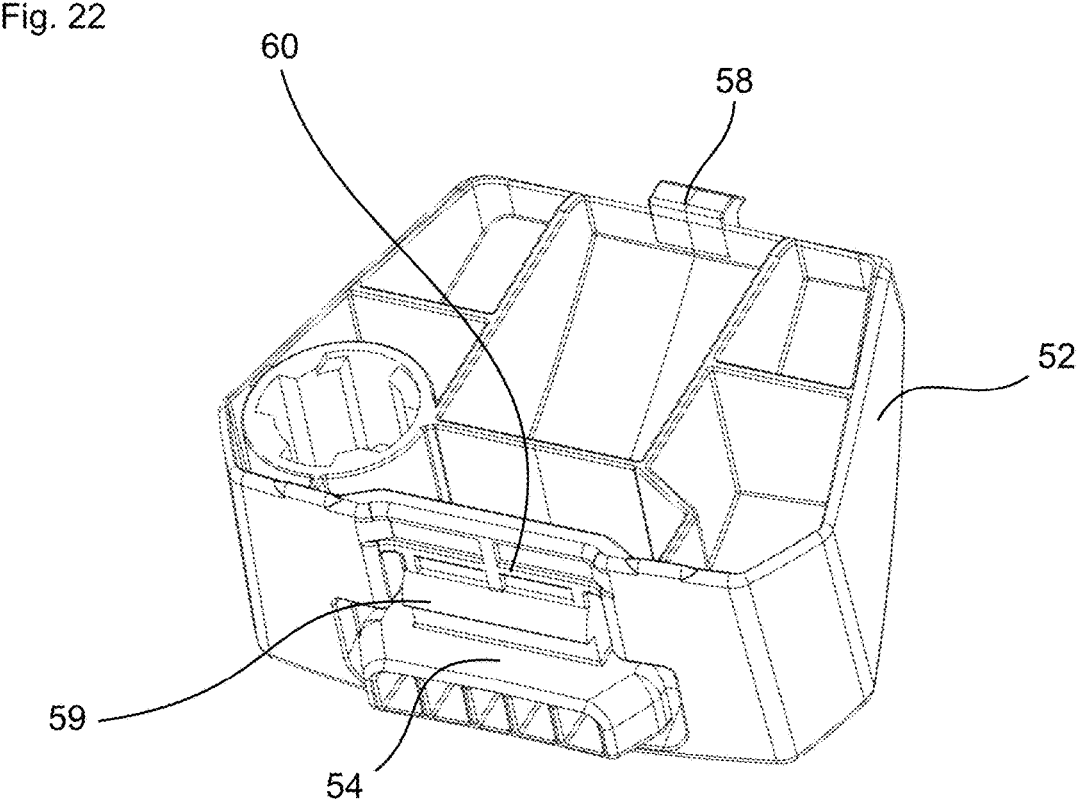
FIG. 22 shows the lid of FIG. 21 in a perspective bottom view.
Figure 23:
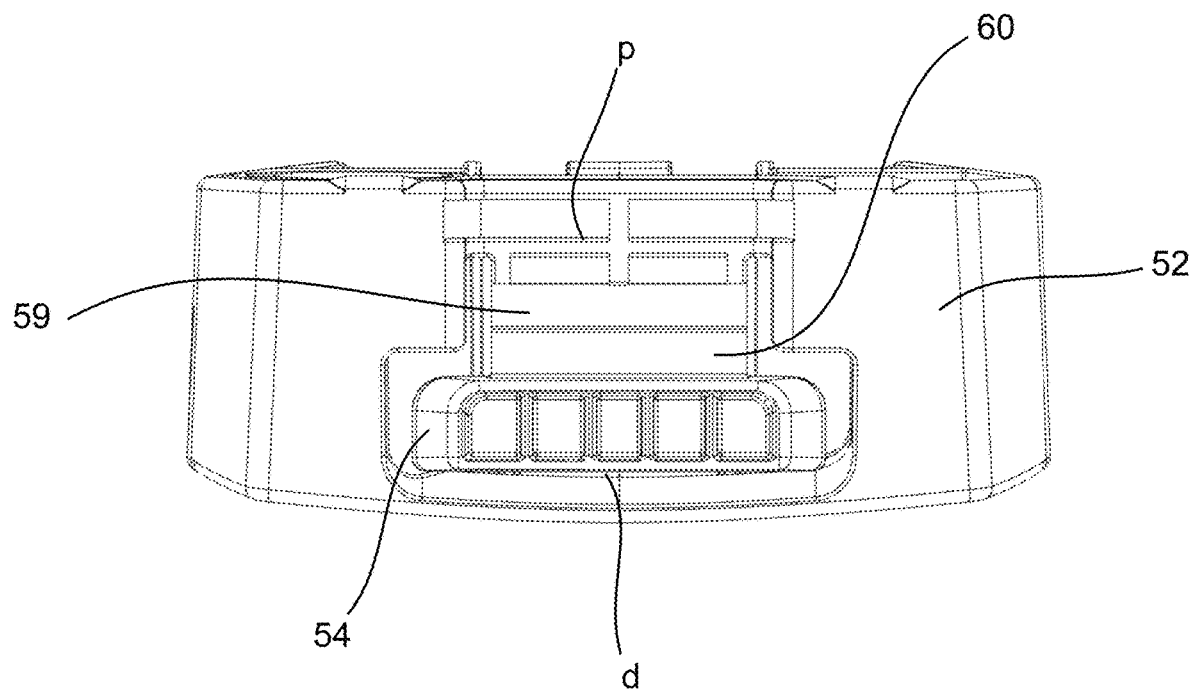
FIG. 23 shows the lid of FIG. 21 in a bottom view.
Figure 24:
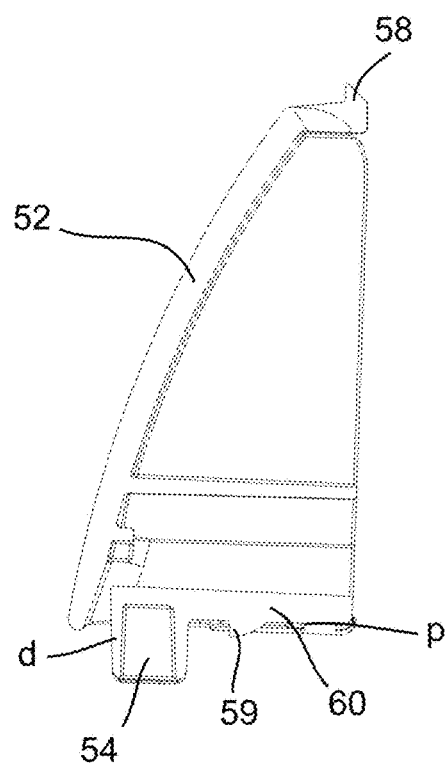
FIG. 24 shows only the lid in a schematic cross-sectional view along line E-E of FIG. 6.
Figure 25:
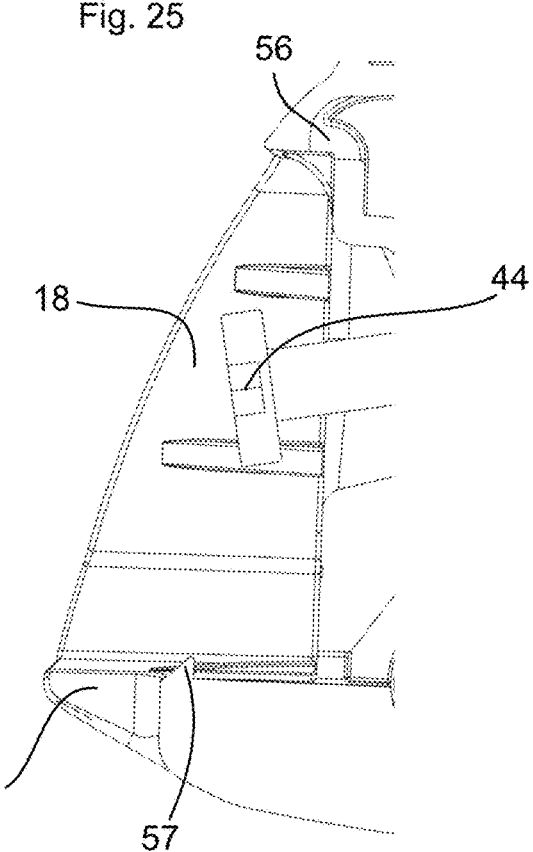
FIG. 25 shows only the lid accommodation in a schematic cross-sectional view along line E-E of FIG. 6.
Figure 26:
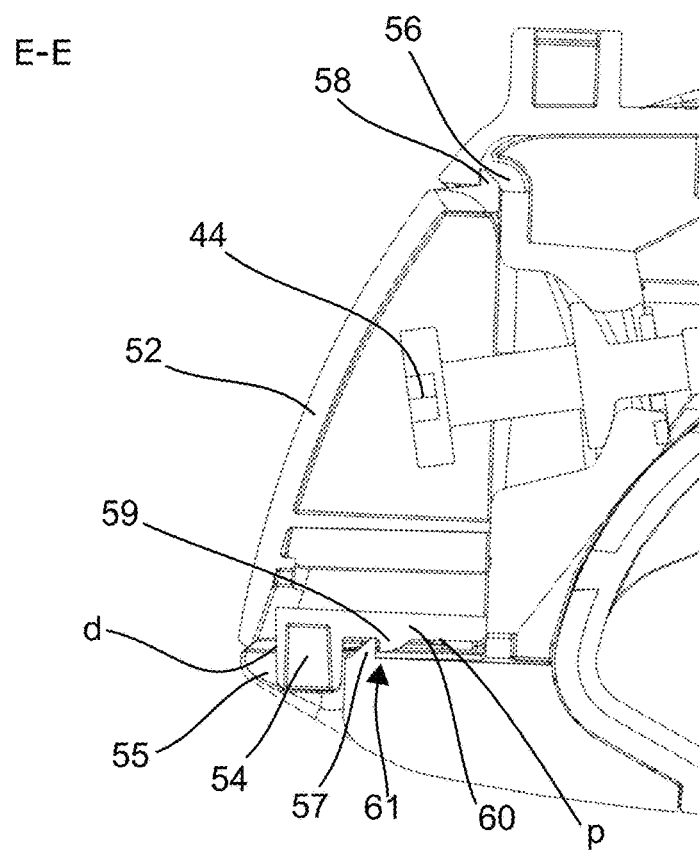
FIG. 26 shows the combination of lid and lid accommodation in a schematic cross-sectional view along line E-E of FIG. 6.

As derivable from FIG. 21, the lid 52 comprises a release button 54 provided at the bottom side thereof. Furthermore, as derivable from FIGS. 20 and 25, the lid accommodation 18 comprises a recess 55 at its bottom side for accommodating the release button 54 of the lid 52. The lid accommodation 18 comprises at its upper side an undercut 56 and at its lower side a lip-like protrusion 57, which is located inwards of the recess 55 for accommodating the release button 54 of the lid 52. In the present embodiment, the undercut 56 and the protrusion 57 are provided centrally in widthwise direction WR of the first clamping portion 3. Furthermore, as derivable from FIGS. 21, 22 and 24, the protective lid 52 comprises a hook 58 at its upper side and a lip-like protrusion 59 at its lower side, the hook 58 and the protrusion 59 being provided centrally in widthwise direction of the lid 52. For locking the protective lid 52 in the lid accommodation 18, the hook 58 of the lid 52 on the upper side is inserted into the undercut 56 of the lid accommodation 18, and the protrusion 59 on the lower side of the lid 52 is pressed over and behind the protrusion 57 on the lower side of the lid accommodation 18 to bring the lid 52 into a locked state, as shown in FIG. 26. The combination of the undercut 56 and the protrusion 57 of the lid accommodation 18 as well as the hook 58 and the protrusion 59 on the lid 52 constitute a locking device 61 for locking the lid 52 in the lid accommodation 18.

As derivable from FIGS. 22 to 24 and FIG. 26, the bottom side of the protective lid 52 comprises a swing arm 60, which is supported at its proximal end p at the inner side of the lid 52, i.e. the side facing towards the second clamping portion 4 in a locked state of the lid 52 shown in FIG. 26. Besides said connection at its proximal end p, the swing arm 60 is freely suspended and not connected to the protective lid 52 at any other part. At the distal end d of the swing arm 60, the release button 54 is provided. Between the proximal end p and the distal end d, the protrusion 59 is situated on the underside of the swing arm 60. The connection of the swing arm 60 to the remaining lid 52 is configured such that, by pressing the release button 54 upwards with normal operating forces, the swing arm 60 is rotated upwards to displace the protrusion 59 for bringing it out of engagement with the protrusion 57 of the lid accommodation, thereby allowing a pivoting of the protective lid 52 out of the lid accommodation 18 for demounting of the same. For mounting the lid 52 into the lid accommodation 18, the hook 58 is inserted in the undercut 56, as described above, before the protrusion 59 at the underside of the lid 52 is slid over the protrusion 57 at the underside of the lid accommodation 18, which is accompanied with an upwards movement of the swing arm 60. In the present embodiment, the entire protective lid 52, including the swing arm 60 and the release button 54 are integrally formed, e.g. by injection molding.

Figure 27:
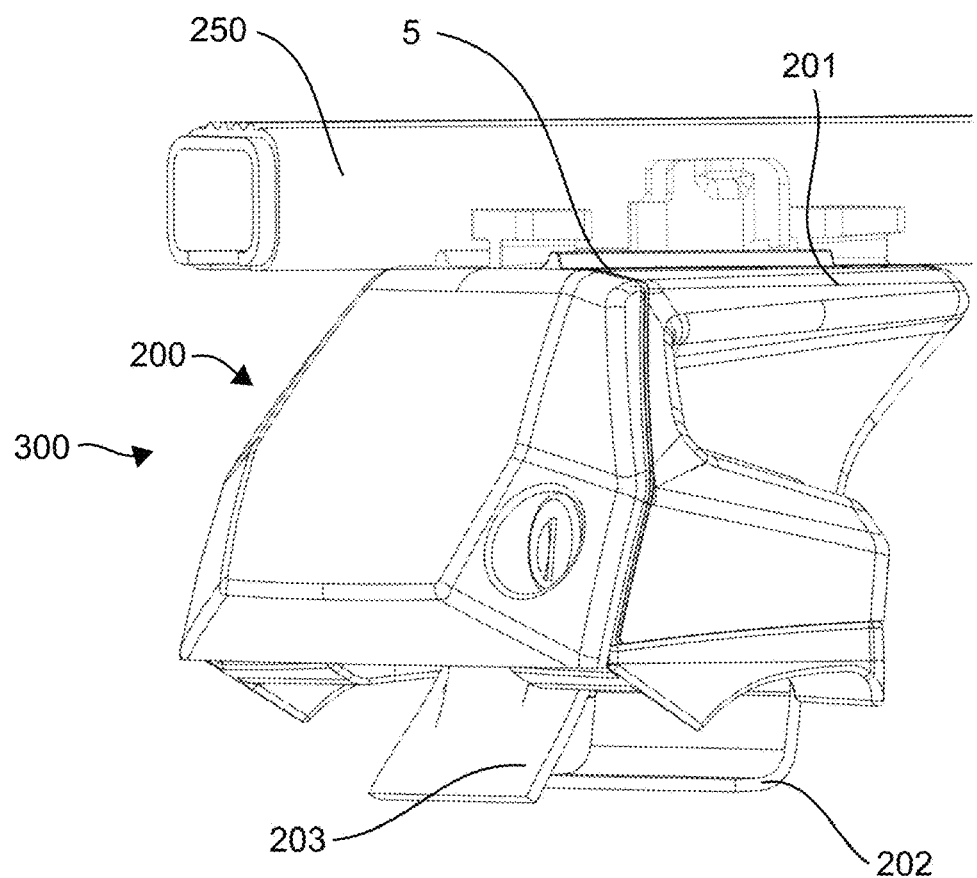
FIG. 27 shows an arrangement comprising a roof rack foot and a cross bar according to a further embodiment of the present invention in a perspective view.
Figure 28:
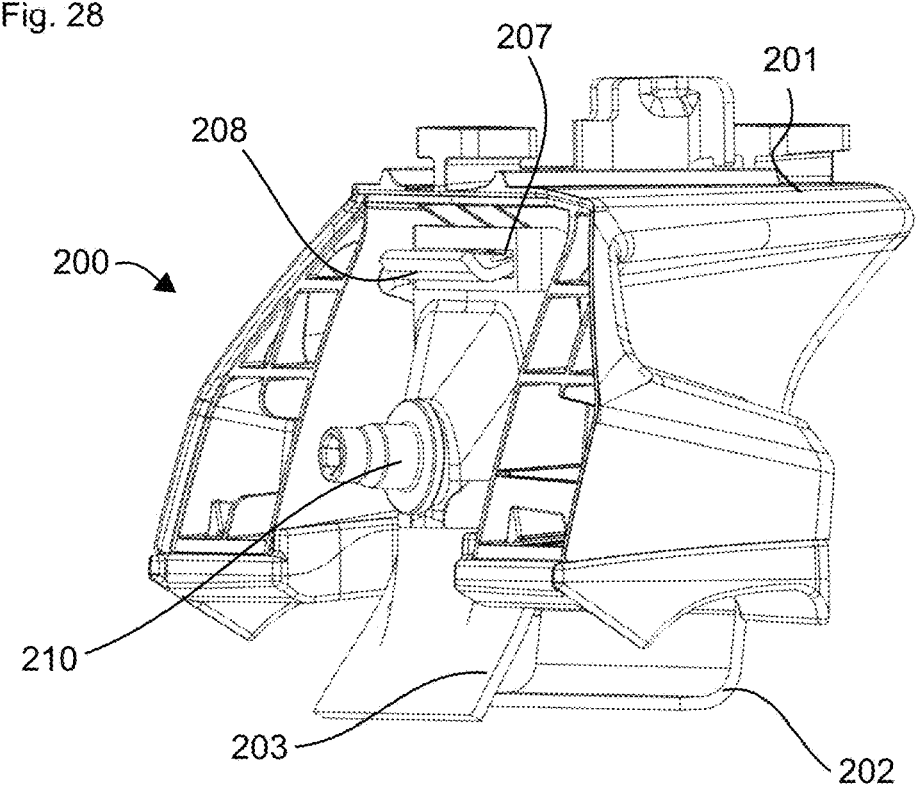
FIG. 28 shows the roof rack foot of the arrangement of FIG. 27 in a perspective view, wherein the lid is removed.
Figure 29:
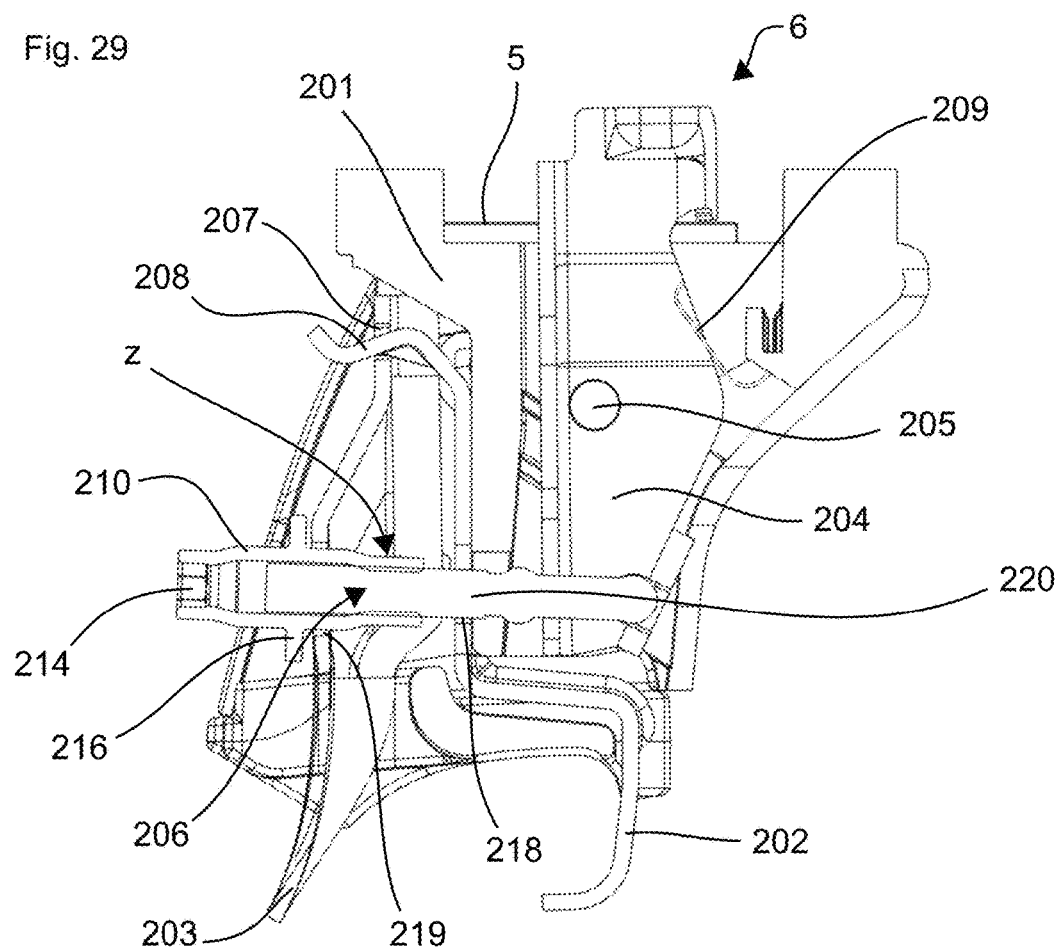
FIG. 29 shows a schematic sectional view through the roof rack foot of FIG. 28.

FIG. 27 shows an arrangement 300 comprising a roof rack foot 200 and a cross bar 250 according to an alternative embodiment of the present invention. The cross bar 250 may exhibit a substantially squared cross section. In FIG. 27, the cross bar is depicted in a transparent fashion. Furthermore, the cross bar 250 may comprise a slot, a cavity and abutment surfaces corresponding to the cross bar described in connection with the first embodiment. The roof rack foot 200 is configured to lock the cross bar 250 to a roof rail of a vehicle, as described above in connection with the first embodiment. Specifically, the roof rack foot 200 is configured to lock the cross bar 250 to a roof rail of a flush-rail type. The roof rack foot 200 comprises a main body 201 forming the supporting surface 5 for supporting the cross bar 250 thereupon as well as a first clamping portion 202 and a second clamping portion 203 for clamping a roof rail (not shown) therebetween. The first clamping portion 202 is provided stationary with respect to the main body 201. The second clamping portion 203 is provided movable relatively to the first clamping portion 202. Specifically, the second clamping 203 comprises a slit 207 at its upper portion through which a protruding portion 208 of the first clamping portion 202 extends, the slit 207 allowing for a pivotability of the first and second clamping portions 202, 203 with respect to each other. Additionally, the roof rack foot 200 according to this alternative embodiment comprises an anchor 204 with an anchoring portion 6 for insertion into the cavity of the cross bar 250, as described above in connection with the first embodiment. The first clamping portion 202 is provided behind the second clamping portion 203 and in front of the anchor 204. The anchoring portion 6 comprises anchoring arms, which may be formed like the anchoring arms of the embodiment described in connection with FIGS. 1-26, for engaging with the abutment surfaces of the cross bar 250 to lock the cross bar 250 to the supporting surface 5 of the roof rack foot 200. The anchor 204 is provided pivotably with respect to the main body 201 and therefore the supporting surface 5 about a pivoting support 205.

Furthermore, the roof rack foot 200 comprises an adjustment mechanism 206, which is mechanically connected to the bottom side of the anchor 204. Specifically, the adjustment mechanism 206 engages with the anchor 204 below the pivoting support 205, the pivoting support 205 being located between said engagement of the adjustment mechanism 206 with the anchor 204 and the anchoring portion 6. By actuating the adjustment mechanism 206, the second clamping portion 203 can be moved towards the first clamping portion 202 to clamp a roof rail (not shown) therebetween. Once the roof rail (not shown) is in contact with the first and second clamping portions 202, 203, by operating the adjustment mechanism 206 further, the anchor 204 is rotated about the pivoting support 205 to bring the anchoring portion 6 into engagement with the abutment surfaces of a cross bar 250 supported on the supporting surface 5, as described in connection with the previous embodiment. Furthermore, the anchor 204 of the roof rack foot 200 is biased via a spring member 209 to a rotational position, in which the anchoring portion 6 is rotated away from the supporting surface 5. This allows for an easy mounting of the cross bar 250 on the supporting surface 5 of the roof rack foot 200 without an engagement of the anchoring portion 6 with the abutment surfaces inside the cavity of the cross bar 250.

Figure 30:
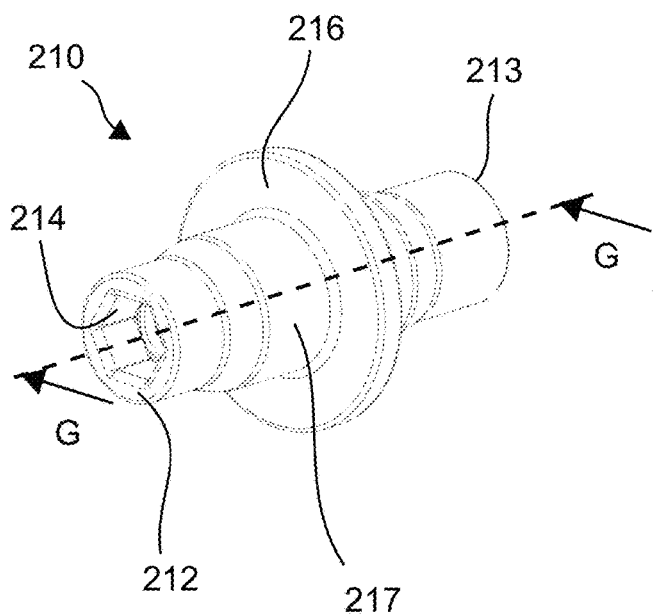
FIG. 30 shows a nut of an adjustment mechanism of the roof rack foot shown in FIGS. 27-29 in a perspective view.
Figure 31:
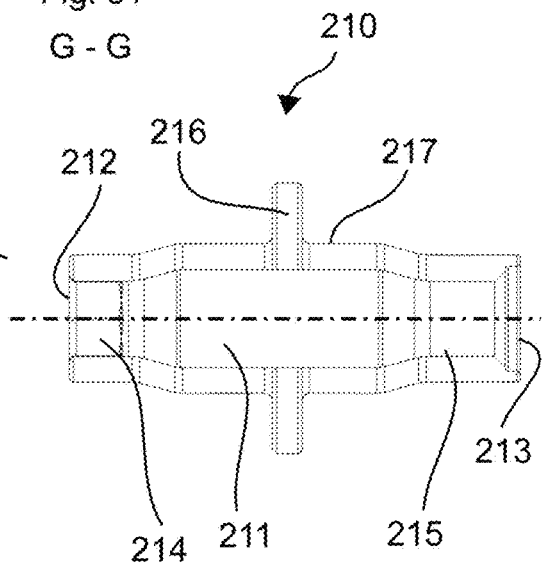
FIG. 31 shows the nut of FIG. 30 in a sectional view along line G-G.

The adjustment mechanism 206 comprises an actuation element 210, which is configured as a nut in the present embodiment. The nut 210 is illustrated in FIGS. 30 and 31. The nut 210 is configured as a rotationally symmetric element comprising a clearance hole 211 extending from a first end face 212 to a second end face 213 along the symmetry axis s of the nut 210. Adjacent to the first end face 212, the nut exhibits a mechanical interface 214 for a tool (not shown). In the present embodiment, the mechanical interface is configured as a hexagonal hole 214 with which a hexagon key (not shown) can be engaged for rotating the nut 210. Adjacent the opposite second end face 213, the nut 210 exhibits an internal thread 215 for screwing the nut 210 onto a threaded bolt. Between the internal thread 215 and the hexagonal hole 214, the clearance hole 211 of the nut 210 is free of a thread and of a mechanical interface. The length of the portion 215 with internal thread substantially corresponds to the length of the portion 214 with hexagonal hole, wherein the length of the portion therebetween is substantially double the length of the portion 215 with internal thread. Furthermore, said portion therebetween comprises a diameter larger than the diameter of the portion 215 with internal thread. The nut 210 furthermore comprises a shoulder 216. In lengthwise direction of the nut 210, the shoulder 216 is substantially provided centrally. In the present embodiment, the shoulder 216 is formed like a washer, which is configured rotationally symmetric with respect to the symmetry axis s of the nut 210. The shoulder 216 extends away from an outer surface 217 of the nut 210.

In addition, the adjustment mechanism 206 comprises an engagement element 220. In the present embodiment, the engagement element 220 is mechanically connected with the anchor 204 at the bottom portion thereof, as described above. The adjustment mechanism 206 is configured such that by moving the engagement element 220 translationally, the anchor 204 is rotated about the pivoting support 205. In the present embodiment, the engagement element 220 is formed as a bolt extending away from the anchor 204 through an opening 218 in the first clamping portion 202 and an opening 219 in the second clamping portion 203. The second clamping portion 203 can be moved relatively to the bolt 220, as described above. The bolt 220 exhibits an external thread at least from the first clamping portion 202 onwards towards the second clamping portion 203.

The nut 210 is inserted into the opening 219 of the second clamping portion 203 and screwed with its internal thread 215 onto the external thread of the bolt 220. The threaded engagement of the nut 210 and the bolt 220 is present in an engagement zone (z) provided between the first and second clamping portions 202, 203. Furthermore, the hexagonal hole 214, i.e. the actuation device, and the shoulder 216 are provided on a side of the second clamping portion 203 facing away from the first clamping portion 202.

By turning the nut 210 with a tool engaged with the mechanical interface 214, the nut 210 is screwed onto the bolt 220 to move the shoulder 216 towards the first clamping portion 202. The shoulder 216 engages with the outer surface of the second clamping portion 203, thereby turning the second clamping portion 203 towards the first clamping portion 202 to clamp a roof rail between the two clamping portions 202, 203. Once the clamping portions 202, 203 engage with the roof rail, by further turning the nut 210 via the actuation device, the nut is further screwed onto the bolt 220 to move the bolt 220 towards the anchor 204, thereby turning the anchor 204 around the pivoting support 205 against the bias of the spring element 209, as described above.

Further embodiments of the present invention can be described by following items:

Item 1: A roof rack foot (1) for securing a cross bar (2) to a roof of a vehicle, the cross bar (2) comprising a bottom wall (7.2) with a slot (10) extending in the longitudinal direction ($L_c$) of the cross bar (2) and a cavity (9) for forming an abutment surface (11) inside the cross bar (2), the roof rack foot (1) comprising a supporting surface (5) for supporting the bottom wall (7.2) of the cross bar (2) thereupon; a first clamping portion (3) and a second clamping portion (4) for clamping the roof rack foot (1) to the roof of the vehicle, preferably for clamping a roof rail therebetween, the second clamping portion (4) comprising an anchoring portion (6); the second clamping portion (4) being configured to extend through the slot (10) into the cavity (9) and lock the cross bar (2) to the supporting surface (5) of the roof rack foot (1) by an engagement of the anchoring portion (6) with the abutment surface (11) of the cross bar (2); the second clamping portion (4) comprising an orientation face (40); wherein, in an operational state of the roof rack foot (1) allowing for an insertion of the anchoring portion (6) into the cavity (9) of the cross bar (2), the orientation face (40) abuts against a locating surface (16) of the roof rack foot (1) and/or the cross bar (2) for fixing the angular orientation of the anchoring portion (6) with respect to the supporting surface (5) to simplify insertion of the anchoring portion (6) into the cavity (9).

Item 2: The roof rack foot (1) according to item 1, wherein the roof rack foot (1) exhibits a first operational state, in which the anchoring portion (6) of the second clamping portion (4) is rotatable with respect to the supporting surface (5), preferably about a point of rotation located below the supporting surface (5), and a second operational state, in which the orientation face (40) abuts against the locating surface (16).

Item 3: The roof rack foot (1) according to item 2, further comprising an adjustment mechanism (43), wherein, by operating the adjustment mechanism (43), the roof rack foot (1) can be transferred from the first to the second operational state.

Item 4: The roof rack foot (1) according to item 3, wherein, by operating the adjustment mechanism (43), the first and second clamping portions (3, 4) are movable relatively to each other, the first and second clamping portions (3, 4) being preferably maximally spaced apart from one another in the second operational state.

Item 5: The roof rack foot (1) according to one of items 1 to 4, further comprising a supporting section (3.2) with a top and a bottom surface (14, 15), the top surface (14) forming the supporting surface (5) and the bottom surface (15) forming the locating surface (16), wherein the second clamping portion (4) extends through the supporting section (3.2) from the bottom to the top surface (14, 15).

Item 6: The roof rack foot (1) according to item 5, the second clamping portion (4) comprising an anchor (28) extending through the supporting section (3.2) and a sleeve (29), which is attached to the anchor (28) and provided below the bottom surface (15) of the supporting section (3.2), the sleeve (29) forming the orientation face (40).

Item 7: The roof rack foot (1) according to items 5 and 6, the supporting section (3.2) comprising a slot (12) extending in the longitudinal direction (LR) of the supporting section (3.2) and two locating surfaces (16, 16.1) formed by the bottom surface (15) on both sides of the slot (12) in widthwise direction (WR) of the supporting section (3.2), wherein the sleeve (29) comprises two orientation faces (40, 41) for abutting against the two locating surfaces (16, 16.1) on both sides of the slot (12).

Item 8: The roof rack foot (1) according to item 7, the sleeve (29) comprising two tabs (38, 39) extending away from one another for forming the orientation faces (40, 41).

Item 9: The roof rack foot (1) according to one of items 6 to 8, wherein the sleeve (29) is formed by injection molding.

Item 10: Arrangement (100), comprising a cross bar (2) comprising a bottom wall (7.2) with a slot (10) extending in the longitudinal direction ($L_c$) of the cross bar (2) and a cavity (9) for forming an abutment surface (11) inside the cross bar (2); and a roof rack foot (1) according to one of items 1-9.

Item 11: Roof rack (100) comprising an arrangement (100) according to item 10.

Further embodiments of the present invention can be described by following clauses:

Clause 1: A roof rack foot (1) for securing a cross bar (2) to a roof of a vehicle, the roof rack foot (1) comprising an adjustment mechanism (43) with an actuation device (44), wherein the roof rack foot (1) can be secured to the roof and/or the cross bar (2) by operating the adjustment mechanism (43) via the actuation device (44); and a protective lid (52) with a release button (54) for covering the actuation device (44) of the adjustment mechanism (43); wherein the protective lid (52) can be moved, preferably removed, for exposing the actuation device (44) by pressing the release button (54).

Clause 2: The roof rack foot (1) according to clause 1, wherein the release button (54) is provided at the bottom side of the protective lid (52) in a mounted state of the roof rack foot (1), the release button (54) being preferably pressed upwards for moving the protective lid (54).

Clause 3: The roof rack foot (1) according to clause 1 or 2, the roof rack foot (1) comprising a lid accommodation (18) and a lid locking device (61), which, when engaged, locks the lid (52) in the lid accommodation (18), wherein, by pressing the release button (54), the lid locking device (61) is released for moving the lid (52) to expose the actuation device (44).

Clause 4: The roof rack foot (1) according to clause 3, wherein the locking device (61) comprises a first protrusion (57) on the lid accommodation (18) and a second protrusion (59) on the protective lid (52) for engaging with the first protrusion (57), wherein, by pressing the release button (54), the second protrusion (59) is moved out of engagement with the first protrusion (57).

Clause 5: The roof rack foot (1) according to clause 4, the locking device (61) comprising an undercut (56), which is provided at the lid accommodation (18) opposite to the first protrusion (57), and a hook (58) for insertion into the undercut (56), which is provided at the lid (52) opposite to second protrusion (59).

Clause 6: The roof rack foot (1) according to clause 4 or 5, wherein the protective lid (52) comprises a swing arm (60) with a proximal end (p) and a distal end (d), the release button (54) being formed at the distal end (d) of the swing arm (60) and the second protrusion (59) being formed on the swing arm (60) between the proximal end (p) and the distal end (d).

Clause 7: The roof rack foot (1) according to one of clauses 1 to 6, wherein the protective lid (52) can be removed from the lid accommodation (18) by pressing the release button (54) with a finger and subsequently moving the finger perpendicular to the pressing direction while the release button (54) is still pressed.

Clause 8: The roof rack foot (1) according to one of clauses 1-7, wherein the protective lid (52) is, preferably completely, formed by injection molding.

Clause 9: A roof rack (100) comprising a roof rack foot (1) according to one of clauses 1-8.

Further embodiments of the present invention can be described by following numbers:

Number 1: A roof rack foot (200) for securing a cross bar (250) to a roof of a vehicle, the roof rack foot (200) comprising a clamping portion (203) and an adjustment mechanism (206); the adjustment mechanism (206) comprising an actuation element (210) with an actuation device (214), and an engagement element (220), the actuation element (210) being movably engaged with the engagement element (220) in an engagement zone (z), wherein the roof rack foot (200) can be secured to the roof and/or the cross bar (250) via the clamping portion (203) by operating the adjustment mechanism (206) via the actuation device (214); wherein the actuation device (214) and the engagement zone (z) are at least partially provided on opposite sides of the clamping portion (203) in at least one operating condition of the roof rack foot (200).

Number 2: The roof rack foot (200) according to number 1, wherein the actuation device (214) and the engagement zone (z) are provided on opposite sides of the clamping portion (203) in all operating conditions of the roof rack foot (200).

Number 3: The roof rack foot (200) according to number 1 or 2, the actuation element (210) being a nut and the engagement element (220) a threaded bolt, the nut (210) being in screw connection with the bolt (220) in the engagement zone (z).

Number 4: The roof rack foot (200) according to one of numbers 1 to 3, the actuation device (214) exhibiting a mechanical interface for a tool, preferably a hexagonal hole, and/or a grip portion for turning by hand.

Number 5: The roof rack foot (200) according to numbers 3 and 4, the nut (210) exhibiting a clearance hole (211), wherein the mechanical interface (214) is provided at one end portion and an internal thread (215) at the other end portion of the clearance hole (211), the clearance hole (211) preferably exhibiting no mechanical interface and no internal thread between the first and second end portions.

Number 6: The roof rack foot (200) according to one of numbers 1 to 5, the clamping portion (203) exhibiting an opening (219) through which the actuation element (210) extends, the actuation element (210) comprising a shoulder (216) for engaging with the clamping portion (203), preferably for engaging with the clamping portion (203) on the side where the actuation device (214) is located, the shoulder (216) being preferably provided substantially centrally in length direction of the actuation element (210).

Number 7: The roof rack foot (200) according to one of numbers 1 to 6, wherein the actuation element (210) is integrally formed, preferably by cold forming.

Number 8: The roof rack foot (200) according to one of numbers 1 to 7, the roof rack foot (200) comprising a first and a second clamping portion (202, 203) for clamping the roof rack foot (200) to the roof of the vehicle, preferably for clamping a roof rail therebetween, the actuation device (214) being provided on the side of the second clamping portion (203) facing away from the first clamping portion (202) and the engagement zone (z) being provided between the first and second clamping portions (202, 203).

Number 9: A roof rack (300) comprising a roof rack foot according to one of numbers 1-8.

What is claimed is:

1. A roof rack foot for securing a cross bar to a roof of a vehicle, the roof rack foot comprising:
    a clamping portion; and
    an adjustment mechanism comprising:
        an actuation element with an actuation device, and
        an engagement element,
    wherein the actuation element is movably engaged with the engagement element in an engagement zone,
    wherein the roof rack foot is configured to be secured to the roof or the cross bar by the clamping portion by operating the adjustment mechanism with the actuation device,
    wherein the actuation device and the engagement zone are at least partially provided on opposite sides of the clamping portion in at least one operating condition of the roof rack foot,
    wherein the actuation element is a nut and the engagement element is a threaded bolt, and
    wherein the nut is coupled with the threaded bolt in the engagement zone.

2. The roof rack foot according to claim 1, wherein the actuation device and the engagement zone are provided on opposite sides of the clamping portion in all operating conditions of the roof rack foot.

3. The roof rack foot according to claim 1, wherein the actuation device comprises a mechanical interface for a tool or a grip portion for turning by hand.

4. The roof rack foot according to claim 3, wherein the mechanical interface is a hexagonal hole.

5. The roof rack foot according to claim 3, wherein the nut comprises a clearance hole, and
   wherein the mechanical interface is provided at a first end portion of the clearance hole and an internal thread is provided at a second end portion of the clearance hole.

6. The roof rack foot according to claim 5, wherein the clearance hole does not include a mechanical interface or internal thread between the first and second end portions.

7. The roof rack foot according to claim 1, wherein the actuation element is integrally formed.

8. The roof rack foot according to claim 7, wherein the actuation element is formed by cold forming.

9. The roof rack foot according to claim 1, wherein the roof rack foot comprises a first clamping portion and a second clamping portion configured to clamp the roof rack foot to the roof of the vehicle, and
   wherein the actuation device is provided on a side of the second clamping portion facing away from the first clamping portion and the engagement zone is provided between the first and second clamping portions.

10. The roof rack foot according to claim 9, wherein the first clamping portion and second clamping portion are configured to clamp a roof rail therebetween.

11. A roof rack comprising:
   a roof rack foot comprising:
      a clamping portion; and
      an adjustment mechanism comprising:
         an actuation element, and
         an engagement element,
      wherein the actuation element is movably engaged with the engagement element,
      wherein the actuation element comprises a shoulder configured to engage with the clamping portion,
      wherein the roof rack foot is configured to be secured to a roof or a cross bar of a vehicle by the clamping portion by operating the adjustment mechanism, and
      wherein operating the adjustment mechanism causes the shoulder of the actuation element to be brought into engagement with the clamping portion to displace the clamping portion.

12. The roof rack according to claim 11, wherein the actuation element is a nut and the engagement element is a threaded bolt.

13. The roof rack according to claim 11, wherein the roof rack foot comprises a first clamping portion and a second clamping portion configured to clamp the roof rack foot to the roof of the vehicle,
   wherein the actuation element comprises an actuation device, and
   wherein the actuation device is provided on a side of the second clamping portion facing away from the first clamping portion.

14. The roof rack according to claim 13, further comprising a cross bar, wherein when the roof rack foot is secured to the roof by the clamping portion, operating the adjustment mechanism moves an anchoring portion of the second clamping portion to bring the anchoring portion into engagement with the cross bar of the roof rack.

15. The roof rack according to claim 11, wherein the actuation element is movably engaged with the engagement element in an engagement zone, and
   wherein the actuation device and the engagement zone are at least partially provided on opposite sides of the clamping portion in at least one operating condition of the roof rack foot.

16. A roof rack foot for securing a cross bar to a roof of a vehicle, the roof rack foot comprising:
   a clamping portion; and
   an adjustment mechanism comprising:
      an actuation element with an actuation device, and
      an engagement element,
   wherein the actuation element is movably engaged with the engagement element in an engagement zone,
   wherein the actuation element comprises a shoulder configured to engage with the clamping portion,
   wherein the roof rack foot is configured to be secured to the roof or the cross bar by the clamping portion by operating the adjustment mechanism with the actuation device, and
   wherein the actuation device and the engagement zone are at least partially provided on opposite sides of the clamping portion in at least one operating condition of the roof rack foot.

17. The roof rack according to claim 16, wherein the shoulder engages with the clamping portion on a side where the actuation device is located.

18. The roof rack according to claim 16, wherein the shoulder is provided substantially centrally in a length direction of the actuation element.

19. The roof rack foot of claim 16, wherein operating the adjustment mechanism with the actuation device causes the shoulder of the actuation element to be brought into engagement with the clamping portion to displace the clamping portion.

20. The roof rack foot of claim 16, wherein the clamping portion comprises an opening through which the actuation element extends.

* * * * *

UNITED STATES PATENT AND TRADEMARK OFFICE
CERTIFICATE OF CORRECTION

PATENT NO. : 12,054,124 B2
APPLICATION NO. : 17/748671
DATED : August 6, 2024
INVENTOR(S) : Olaison et al.

Page 1 of 1

It is certified that error appears in the above-identified patent and that said Letters Patent is hereby corrected as shown below:

In the Claims

In Column 26, Claim 17, Line 35, after "rack" insert --foot--.

In Column 26, Claim 18, Line 38, after "rack" insert --foot--.

Signed and Sealed this
Twenty-second Day of October, 2024

Katherine Kelly Vidal
*Director of the United States Patent and Trademark Office*